United States Patent
Wang et al.

(10) Patent No.: US 11,894,765 B2
(45) Date of Patent: Feb. 6, 2024

(54) POWER CONVERSION DEVICE

(71) Applicant: Delta Electronics (Shanghai) Co., Ltd., Shanghai (CN)

(72) Inventors: Yi-Chao Wang, Shanghai (CN); Kai Dong, Shanghai (CN); Shuai-Lin Du, Shanghai (CN); Jin-Fa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 55 days.

(21) Appl. No.: 17/807,142

(22) Filed: Jun. 16, 2022

(65) Prior Publication Data
US 2023/0006540 A1     Jan. 5, 2023

(30) Foreign Application Priority Data
Jul. 5, 2021 (CN) .......................... 202110758324.1

(51) Int. Cl.
*H02M 1/42* (2007.01)
*H02M 1/00* (2006.01)
*H02M 3/00* (2006.01)
*H02M 7/219* (2006.01)

(52) U.S. Cl.
CPC ....... *H02M 1/4233* (2013.01); *H02M 1/0085* (2021.05); *H02M 1/0095* (2021.05); *H02M 3/01* (2021.05); *H02M 7/219* (2013.01); *H02M 1/42* (2013.01); *H02M 1/4208* (2013.01); *H02M 1/4241* (2013.01)

(58) Field of Classification Search
CPC .... H02M 1/42; H02M 1/4208; H02M 1/4233; H02M 1/4241
See application file for complete search history.

(56) References Cited

U.S. PATENT DOCUMENTS

| | | | |
|---|---|---|---|
| 10,536,073 B2 * | 1/2020 | Young | H02M 7/10 |
| 10,686,368 B2 * | 6/2020 | Hähre | H02J 7/0042 |
| 2016/0065081 A1 * | 3/2016 | Raju | H02M 3/33571 |
| | | | 29/602.1 |
| 2018/0183335 A1 * | 6/2018 | Fan | H02M 3/01 |

(Continued)

FOREIGN PATENT DOCUMENTS

| | | |
|---|---|---|
| CN | 102522896 B | 11/2014 |
| CN | 103296882 B | 9/2015 |
| CN | 105897004 B | 11/2019 |

*Primary Examiner* — Gary A Nash
(74) *Attorney, Agent, or Firm* — CKC & Partners Co., LLC

(57) ABSTRACT

The present disclosure provides a power conversion device. The power conversion device includes the multi-level power factor correction circuit, the at least one output capacitor, the at least one input capacitor group, the first resonant conversion circuit and the second resonant conversion circuit. The at least one input capacitor group includes the first input capacitor and the second input capacitor. The at least one output capacitor is connected to an output part of the multi-level power factor correction circuit. The at least one input capacitor group is connected to the at least one output capacitor in parallel. The second input capacitor is connected to the first input capacitor in series. The input part of the first resonant conversion circuit is connected to first input capacitor in parallel. The input part of the second resonant conversion circuit is connected to the second input capacitor in parallel.

31 Claims, 18 Drawing Sheets

(56) References Cited

U.S. PATENT DOCUMENTS

2018/0241318 A1* 8/2018 Chen .................... H02M 1/0085
2018/0351467 A1* 12/2018 Son ........................ B60L 53/22
2020/0212817 A1* 7/2020 Sun ....................... H02M 1/083

* cited by examiner

POWER CONVERSION DEVICE

CROSS-REFERENCE TO RELATED APPLICATION

This application claims priority to China Application Serial Number 202110758324.1, filed Jul. 5, 2021, which is herein incorporated by reference in its entirety.

BACKGROUND

Field of Invention

The present disclosure relates to a conversion device. More particularly, the present disclosure relates to a power conversion device.

Description of Related Art

With the wide application of switching power supplies in data centers, communication equipment and other fields, the increasing requirements mainly focus on power levels, voltage classes, high efficiency and high power density of power supplies. In order to achieve input current shaping and rapid adjustment of output voltage, a two-stage circuit architecture is mainly used in high-power applications. The front-end circuit is a power factor correction circuit (PFC), and the back-end circuit is an isolated DC-DC circuit with a resonant conversion topology. Further, the PFC circuit is often implemented by a BOOST circuit, and the isolated DC-DC circuit usually includes an inverter circuit, a resonant circuit and a rectifier circuit, but the efficiency and power density of the two-stage circuit architecture are unsatisfactory. Due to the use of high-voltage devices, it is difficult to further increase the switching frequency and improve the heat and power distribution of the transformer and EMI characteristics in the circuit.

SUMMARY

It is to be understood that both the foregoing general description and the following detailed description are by examples, and are intended to provide further explanation of the invention as claimed.

The present disclosure provides a power conversion device. The power conversion device includes a multi-level power factor correction circuit, at least one output capacitor, at least one input capacitor group, a first resonant conversion circuit and a second resonant conversion circuit. The at least one input capacitor group includes a first input capacitor and a second input capacitor. The at least one output capacitor is electrically connected to an output part of the multi-level power factor correction circuit in parallel. The at least one input capacitor group is electrically connected to the at least one output capacitor in parallel. The second input capacitor is electrically connected to the first input capacitor in series. An input part of the first resonant conversion circuit is connected to first input capacitor in parallel. An input part of the second resonant conversion circuit is electrically connected to the second input capacitor in parallel.

Therefore, according to the technical content of the present disclosure, the power conversion device of the present disclosure is a high-efficiency and high-power-density switching power supply topology structure that can use low-voltage devices to reduce switching losses, reduce common mode noise, reduce input and output current ripple, reduce input inductance and electromagnetic interference filters, and improve EMI characteristics.

BRIEF DESCRIPTION OF THE DRAWINGS

The invention can be more fully understood by reading the following detailed description of the embodiment, with reference made to the accompanying drawings as follows.

Figure 1:
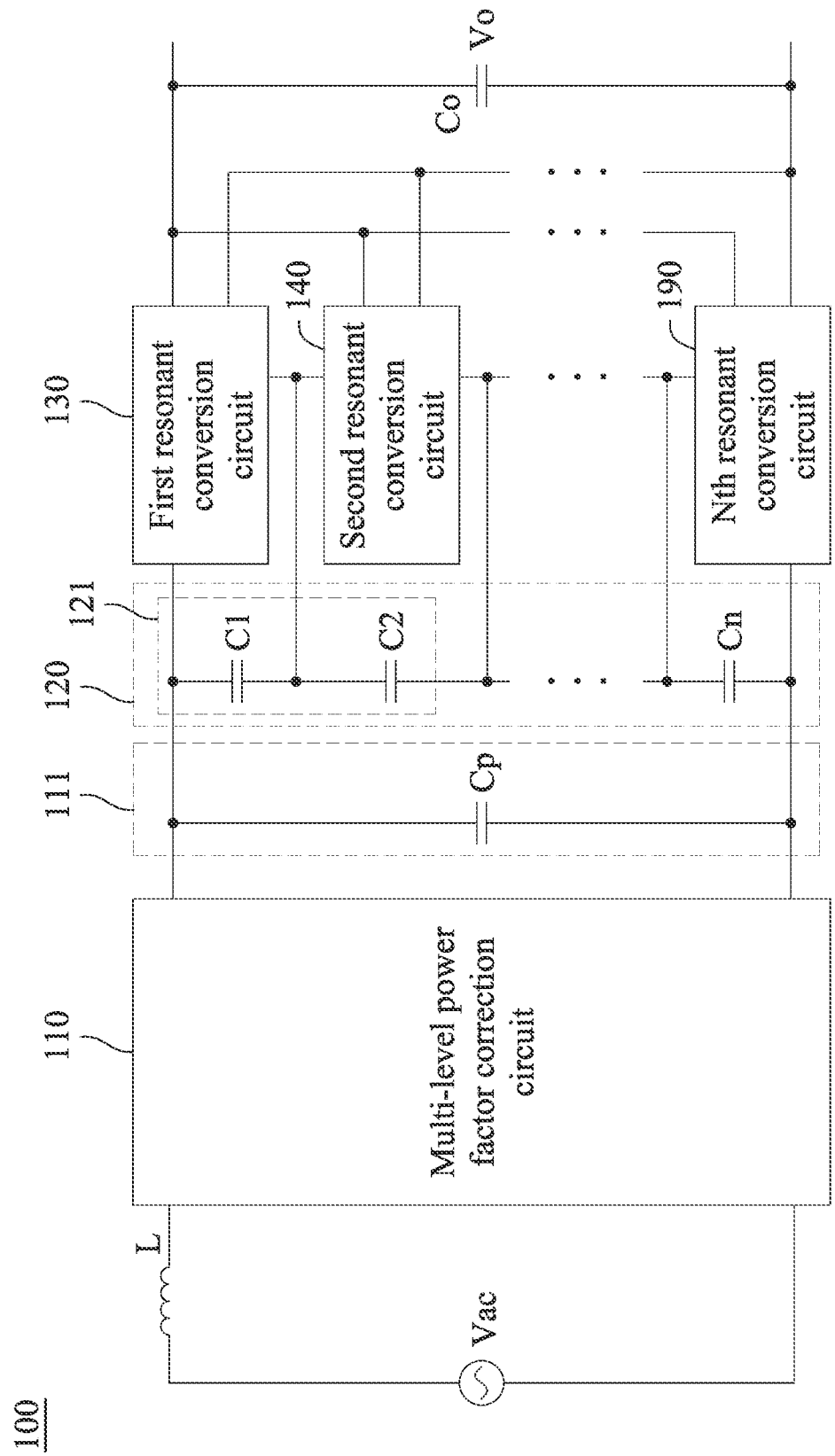
FIG. 1 shows a schematic diagram of a power conversion device according to one embodiment of the present disclosure.

It should be noted that, in accordance with the practical requirements of the description, the features in the diagram are not necessarily drawn to scale. In fact, for the purpose of clarity of discussion, the size of each feature may be increased or decreased arbitrarily.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

FIG. 1 shows a schematic diagram of a power conversion device 100 according to one embodiment of the present disclosure. As shown in the figure, the power conversion device 100 includes a multi-level power factor correction circuit 110, at least one output capacitor 111, at least one input capacitor group 120, and at least one resonant conversion module. The at least one input capacitor group includes multiple input capacitors. The at least one resonant conversion module includes multiple resonant conversion circuits.

In the connection relationship, the at least one output capacitor 111 is connected to the output part of the multi-level power factor correction circuit 110 in parallel. The number of capacitors included in the at least one output capacitor 111 can be determined according to the multi-level topological characteristics of the multi-level power factor correction circuit 110. The at least one input capacitor group and its corresponding output capacitor 111 are connected in parallel. In some embodiments, the at least one output capacitor 111 includes an output capacitor Cp; the at least one input capacitor group 120 includes an input capacitor group; the input capacitor group and the output capacitor are connected in parallel. In other embodiments, the at least one output capacitor 111 includes the multiple output capacitors Cp; the at least one input capacitor group 120 includes the multiple input capacitors group; the multiple output capacitor Cp are connected in series with each other; the multiple input capacitors group are connected in series with each other, the multiple input capacitors group correspond to the multiple output capacitors one to one, and each input capacitor group is connected to the corresponding output capacitor in parallel. Each input capacitor group includes the multiple input capacitors, and the multiple input capacitors are connected in series with each other. Multiple resonant conversion circuits and multiple input capacitors are corresponding one to one, and the input part of each of the multiple resonant conversion circuits is connected to the corresponding input capacitor.

As shown in the FIG. 1, the power conversion device 100 includes the multi-level power factor correction circuit 110, the at least one output capacitor 111, the at least one input capacitor group 120, the first resonant conversion circuit 130, and the second resonant conversion circuit 140. The at least one input capacitor group 120 is connected to the at least one output capacitor 111 in parallel, the at least one output capacitor 111 includes the output capacitor Cp, the at least one input capacitor group 120 includes the first input capacitor group 121, and the first input capacitor group 121 includes the first input capacitor C1 and the second input capacitor C2. In some embodiments, the first input capacitor C1, the second input capacitor C2, and the output capacitor Cp can be a single capacitor, or consist of multiple capacitors in series, parallel or series-parallel.

In the connection relationship, at least one output capacitor 111 is connected to the output part of the multi-level power factor correction circuit 110. The output part of the multi-level power factor correction circuit 110 is connected to the at least one output capacitor 111 in parallel. The series connection of the first input capacitor C1 and the first input capacitor C2 is connected to the output capacitor Cp in parallel. The input part of the first resonant conversion circuit 130 is connected to the first input capacitor C1 in parallel. The input part of the second resonant conversion circuit 140 is connected to the second input capacitor C2 in parallel.

In one embodiment, at least one output capacitor 111 includes the line-frequency capacitor, and the at least one input capacitor group 120 includes the high-frequency capacitor. The output capacitor is connected to the output part of the multi-level power factor correction circuit 110, and the rated capacitance of the output capacitor is bigger. The output capacitor is mainly used to filter line-frequency ripples, has a slow response, and stores electrical energy to provide power supply for the resonant conversion module. The input capacitor is connected to the input terminal of the corresponding resonant conversion circuit, and the rated capacitance of the input capacitor is smaller, which can match the switching frequency of the resonant conversion circuit, and be beneficial to realize the voltage equalization of the input capacitor.

In one embodiment, the output part of the multi-level power factor correction circuit 110 includes the first output terminal and the second output terminal, the at least one output capacitor includes an output capacitor Cp, and the first output terminal and the second output terminal are respectively connected to both ends of output capacitor Cp. The input part of the first resonant conversion circuit 130 includes the first input terminal and the second input terminal, and the first input terminal and the second input terminal are respectively connected to both ends of the first input capacitor C1. The input part of the second resonant conversion circuit 140 includes the third input terminal and the fourth input terminal, and the third input terminal and the fourth input terminal are respectively connected to both ends of the second input capacitor C2. The output part of the first resonant conversion circuit 130 is parallel to the output part of the second resonant conversion circuit 140, and the output part of the first resonant conversion circuit 130 is connected to the output capacitor Co in parallel, to provide the output voltage Vo.

As shown in the FIG. 1, in the present disclosure, the switching power supply structure consisting of the capacitor 111 and the capacitor group 120 is added between the multi-level power factor correction circuit 110 and the resonant conversion circuits 130 and 140. The resonant conversion circuit 130 is connected to the resonant conversion circuit 140 in series at input side. The capacitor 111 is parallel to the output terminal of the multi-level power factor correction circuit 110 as the output capacitor of the multi-level power factor correction circuit 110; capacitor group 120 is connected in parallel with the output capacitor 111, the serially-connected capacitors in the capacitor group is connected in parallel with the input terminal of the corresponding resonant conversion circuit as the input capacitor of the resonant conversion circuit, the output parts of the resonant conversion circuits 130 and 140 are connected in parallel to quickly realize the voltage equalization and current sharing function and facilitate the modular design. In some embodiments, the present disclosure can have multiple input capacitor groups, each of input capacitor groups includes multiple input capacitors connected in series, and the rated capacitance of multiple input capacitors may be equal. However, a ±20% tolerance between the rated capacitances of these input capacitors can be allowed without affecting the voltage equalization and current sharing capability of the subsequent resonant converter circuit. If there are multiple output capacitors Cp connected in series, the rated capacitances of multiple output capacitors Cp may be equal. However, the rated capacitance of these output capacitors Cp can be allowed to have a tolerance of ±20%, and it will not affect the normal operation of the circuit. If the multi-level power factor correction circuit 110, such as the Neutral point clamped (NPC) topology, it has multiple output capacitors Cp, these output capacitors Cp can be self-balanced, without the need to perform DC bus voltage balance control on the multi-level power factor correction circuit 110. The front-end multi-level power factor correction circuit 110 uses the multi-level topology, and the number of levels can be adjusted as required. The back-end uses the resonant conversion circuit topology in series at input side, and the number of resonant conversion circuits can be adjusted as required. Therefore, the power conversion device 100 of the present disclosure has a high conversion efficiency and high power density, and can effectively reduce switching loss by selecting low-voltage electrical components, reduce common mode noise, reduce input and output current ripple, decrease the volume of input inductor and electromagnetic interference (EMI) filter, and improve EMI performance. The front-end of the above-mentioned power conversion device 100 adopts the multi-level power factor correction circuit, and the low-voltage devices with lower loss and easier to drive can be used to reduce the switching loss and improve efficiency; it can reduce the volume of the inductor and improve the efficiency by optimizing the volt-second parameter of the inductor of the multi-level power factor correction circuit and reducing the input current ripple; also, it can reduce the voltage stress of low-voltage devices, reduce du/dt generated when switching devices are activated, improve EMI characteristics, and reduce the size of the filter in the multi-level power correction circuit. Multiple resonant conversion circuits are used in the back-end of the above-mentioned power conversion device, and the input part of the multiple resonant conversion circuits are connected in series and the output part is connected in parallel, which can improve efficiency by using low-voltage devices that are easier to drive and have a smaller product of junction capacitance and on-resistance, and can further increase switching frequency and power density; the corresponding voltage and current of each resonant conversion circuit can be reduced, which can effectively improve the heat and power distribution of the transformer, improve the efficiency and facilitate the design and optimization of the transformer. In addition, this structure can effectively reduce the equivalent parasitic capacitance of the primary and secondary sides to reduce the common mode current, and reduce the du/dt generated during the operation of the switching device, improve the EMI characteristics, and reduce the size of the EMI filter; it also helps to reduce the volume of the output capacitor Co.

Figure 2A:
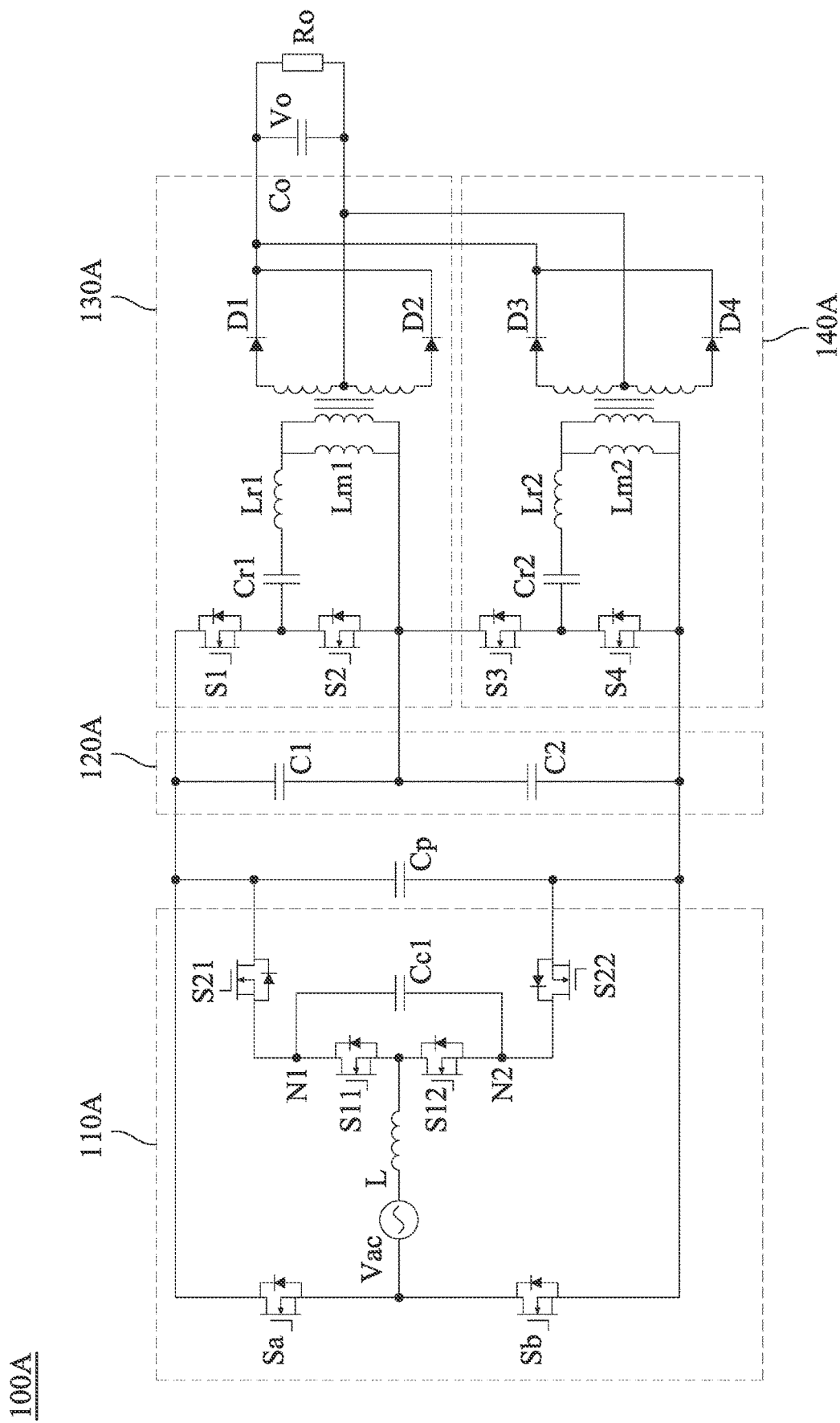
FIG. 2A shows a schematic diagram of a power conversion device according to one embodiment of the present disclosure.

FIG. 2A shows a schematic diagram of a power conversion device 100A according to one embodiment of the present disclosure. As shown in the figure, multi-level power factor correction circuit 110A includes the inductor L, the first bridge arm, and the second bridge arm. The first bridge arm and the second bridge arm are connected to both ends of the output capacitor Cp in parallel. The first bridge arm includes the upper bridge arm switching device Sa and the lower bridge arm switching device Sb; the upper bridge arm switching device Sa and the lower bridge arm switching device Sb are connected to the midpoint of the first bridge arm in series; the second bridge arm includes the first switch S21, the second switch S11, the third switch S12, the fourth switch S22, and the first flying capacitor Cc1; the first switch S21 and the second switch S11 are connected to the first node N1 in series, the second switch S11 and the third switch S12 are connected to the midpoint of the second bridge arm in series, the third switch S12 and the fourth switch S22 are connected to the second node N2 in series; the first flying capacitor Cc1 is connected between the first node N1 and the second node N2; the inductor L is connected between the midpoint of the second bridge arm and the midpoint of the first bridge arm. In one embodiment, one terminal of the inductor L is connected to the midpoint of the second bridge arm, another terminal of the inductor L is connected to the one terminal of the power supply Vac, another terminal of the power supply Vac is connected to the midpoint of the first bridge arm.

In one embodiment, the upper bridge arm switching device and the lower bridge arm switching device Sa, Sb are the low operation frequency switches, for example, the line-frequency switch; the first switch to the fourth switch S21, S11, S12, S22 are the high operation frequency switches, for example, GaN or SiC MOSFET which works at the operation frequency over 10 kHz.

In one embodiment, the output capacitor Cp is the line-frequency capacitor, the first input capacitor C1 and the second input capacitor C2 are the high-frequency capacitors.

In one embodiment, phase shift control is adopted between the first resonant conversion circuit 130A and the second resonant conversion circuit 140A. In one embodiment, the drive signal of the first resonant conversion circuit 130A and the drive signal of the second resonant conversion circuit 140A have a phase difference by 90 degrees.

Figure 2B:
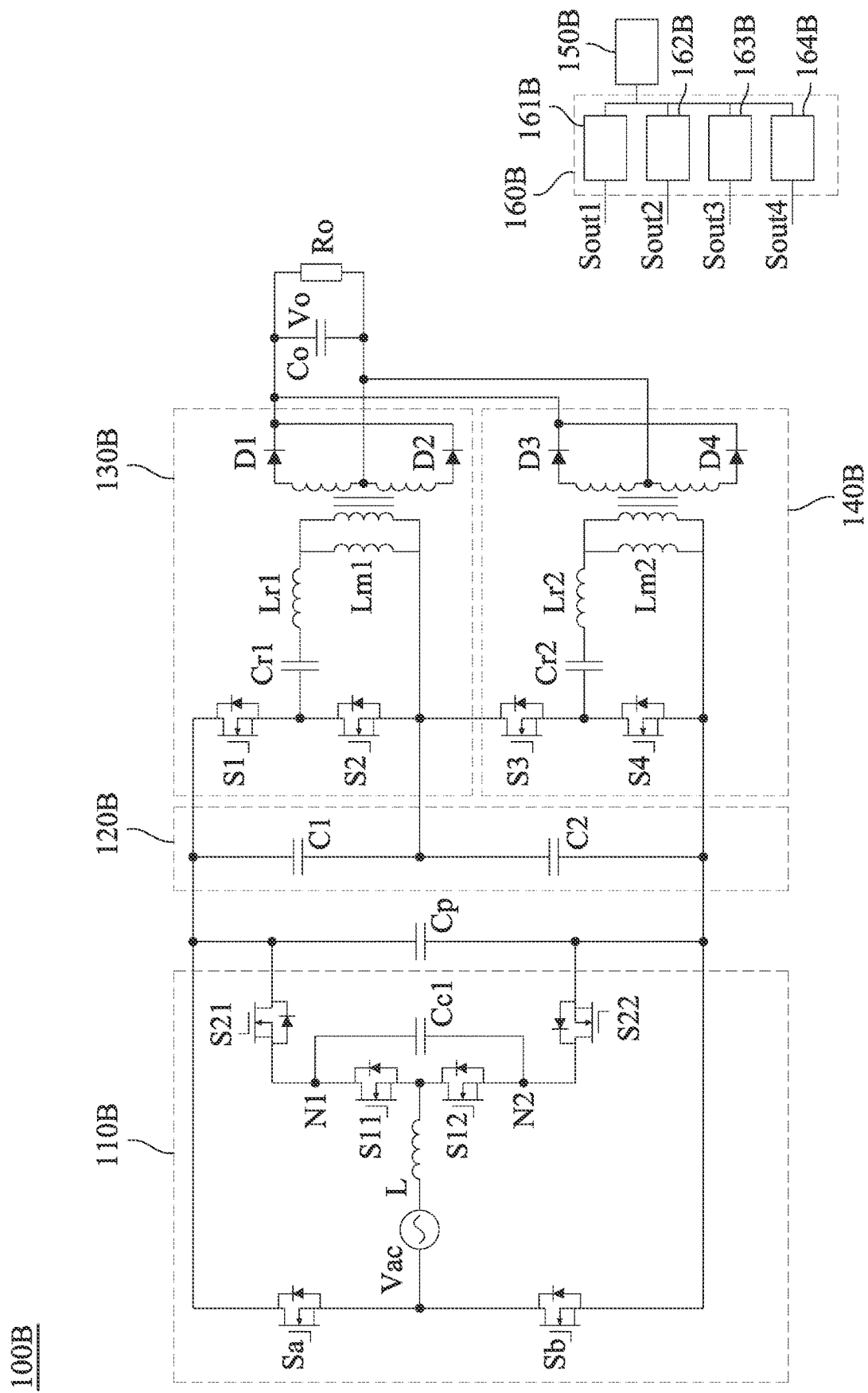
FIG. 2B shows a schematic diagram of a power conversion device according to one embodiment of the present disclosure.

FIG. 2B shows a schematic diagram of a power conversion device 100B according to one embodiment of the present disclosure. Compared to FIG. 2A, the power conversion device 100B of FIG. 2B further includes the controller 150B and the drive module 160B. The controller 150B is connected to the drive module 160B, and the drive module 160B is respectively connected to the first switch to the fourth switch S21, S11, S12, S22. The controller 150B generates a control signal according to a preset control method, the drive module 160B receives the control signal and generates the multiple drive signals Sout1-Sout4 to drive the first switch to the fourth switch S21, S11, S12, S22 to be turned on or turned off. The drive signal of the first switch S21 and the fourth switch S22 are complementary, and the drive signal of the second switch S11 and the third switch S12 are complementary. In one embodiment, the drive module 160B includes the drive circuits 161B-164B, and each of the drive circuits 161B-164B is respectively connected to the first to the fourth switch S21, S11, S12, S22, and the drive circuits 161B-164B receive the control signal and generate the corresponding drive signal Sout1-Sout4 to drive the first switch to the fourth switch S21, S11, S12, S22 to be turned on or turned off. In another embodiment, the drive module 160B can includes two drive circuits, one of the drive circuits is respectively coupled to the second switch S11 and the third switch S12, and receives the control signal and generates the corresponding drive signal Sout2 and Sout3, so as to drive the second switch S11 and the third switch S12 to be turned on or turned off, and another of the drive circuits is respectively coupled to the first switch S21 and the fourth switch S22, and receives the control signal and generates the corresponding drive signal Sout1 and Sout4, so as to drive the second switch S21 and the third switch S22 to be turned on or turned off.

In one embodiment, the preset control method shown in FIG. 2B includes the carrier phase shift method, or the carrier disposition control method, or space vector PWM method.

Figure 2C:
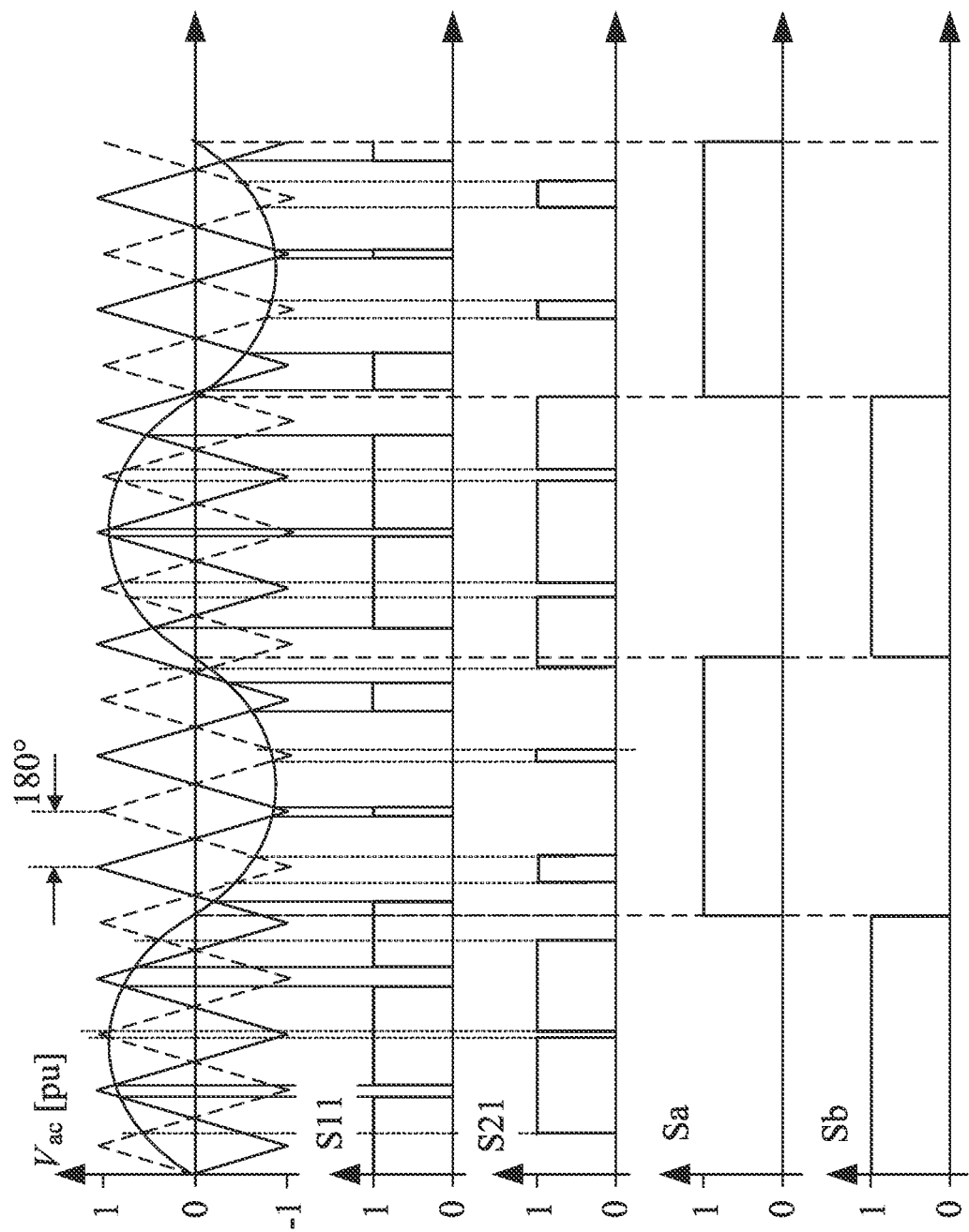
FIG. 2C shows a schematic diagram of control waveform of a power conversion device according to one embodiment of the present disclosure.

Please refer to FIGS. 2A and 2B, the power conversion devices 100A and 100B are switching power supply devices that use a single-phase 3-level power factor correction topology as the front-end power factor correction circuit, and two resonant conversion circuits as the back-end DC-DC conversion circuit. Further, the resonant conversion circuit may be an LLC circuit, such as a half-bridge LLC circuit or a full-bridge LLC circuit. As shown in FIG. 2A, the input parts of the two half-bridge LLC circuits are connected in series and the output parts are connected in parallel. The corresponding modulation waveform of the 3-level power factor correction topology is shown in FIG. 2C. This modulation method is referred to as carrier phase shift modulation. The drive signal of the first switch S21 and the fourth switch S22 are complementary, and the drive signal of the second switch S11 and the third switch S12 are complementary. And the upper bridge arm switching device Sa and the lower bridge arm switching device Sb are turned on according to the polarity of the grid voltage and work at the line frequency. When the input waveform of the grid voltage Vac is in the positive half cycle, the lower bridge arm switching device Sb is always in conductive state, while the upper bridge arm switching device Sa is always in non-conductive state. When the input waveform of the grid voltage Vac is in the negative half cycle, the lower bridge arm switching device Sb is always in non-conductive state, while the upper bridge arm switching device Sa is always in conductive state, the corresponding drive signal of the switches Sn1 and Sn2 are inverted and then driven, and n is a natural number greater than or equal to 1.

Figure 2D:
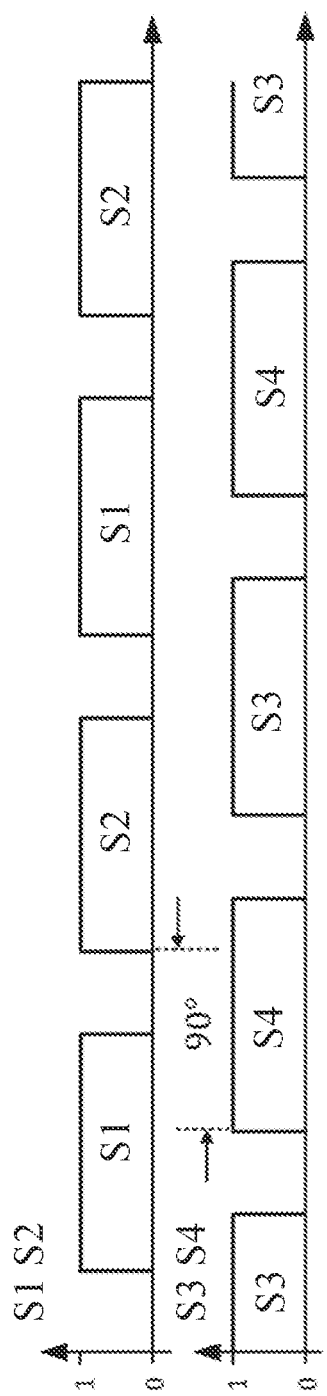
FIG. 2D shows a schematic diagram of control waveform of a power conversion device according to one embodiment of the present disclosure.
Figure 2E:
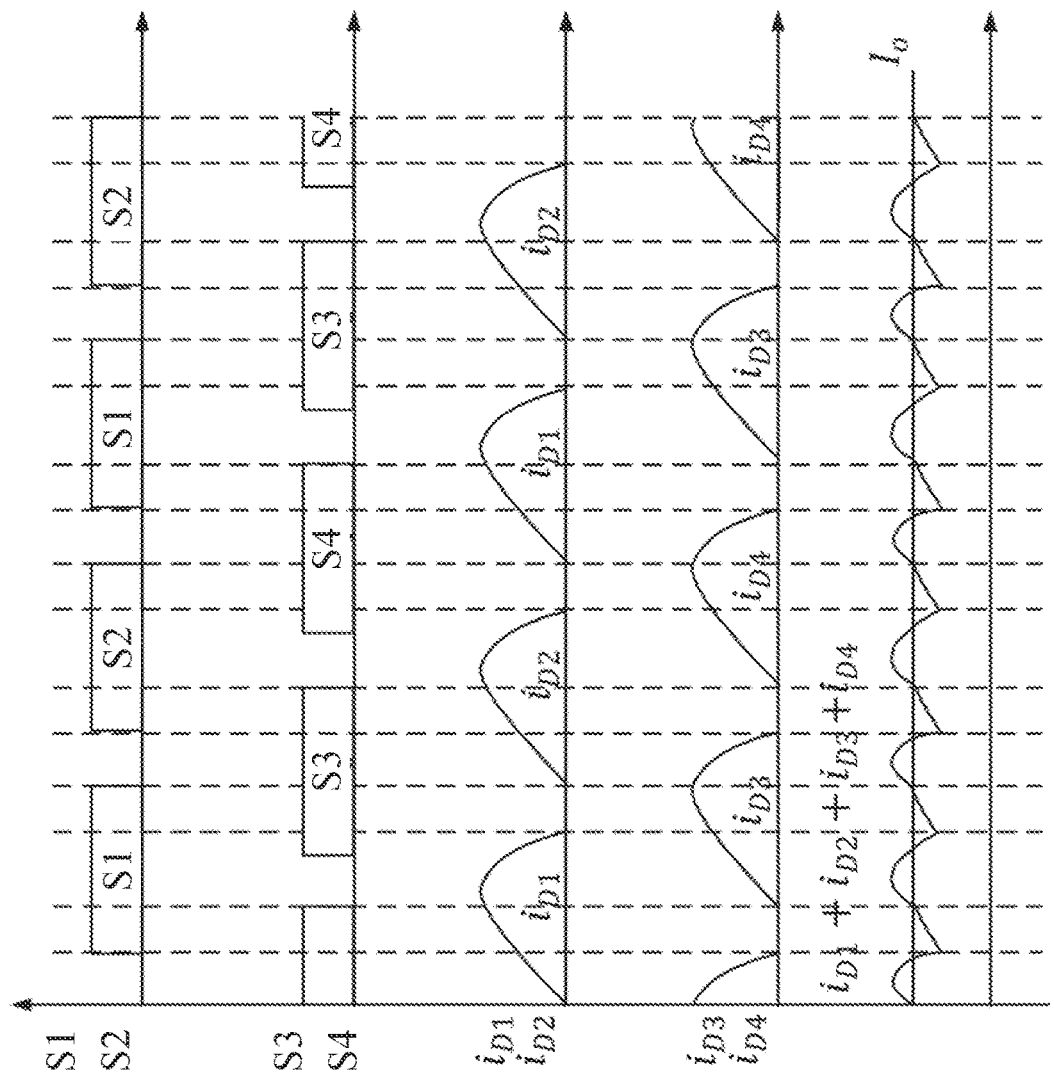
FIG. 2E shows a schematic diagram of control waveform of a power conversion device according to one embodiment of the present disclosure.

In addition, the half-bridge LLC circuit with two input parts in series uses phase shift control to reduce the output current ripple and reduce the size of the filter. The corresponding modulation is shown in FIG. 2D, the drive signals of the upper and lower switches of LLC circuit are complementary, and the drive signals between two LLC circuits have a phase difference by 90 degrees, for example, the drive signal of the upper switch of the first LLC circuit differs by 90 degrees from the drive signal of the upper switch of the second LLC circuit, and the drive signal of the lower switch of the first LLC circuit differs by 90 degrees from the drive signal of the lower switch of the second LLC circuit. In one embodiment, the upper switch S1 and the lower switch S2 of the primary side circuit in one LLC circuit are complementarily turned on, and the upper switch S3 and the lower switch S4 of the primary side circuit in the other LLC circuit are complementarily turned on, and the drive signals of the upper switches S1 and S3 have a phase difference by 90 degrees, the drive signals of the lower switches S2 and S4 have a phase difference by 90 degrees. The above-mentioned back end DC-DC conversion circuit can effectively reduce the output current ripple and realize the soft switching function, as shown in FIG. 2E. In some embodiments, the LLC circuits can also not use phase shift control. Although the output current ripple cannot be minimized at this time, the corresponding control circuit or drive circuit can be simplified. By adopting the above-mentioned back-end DC-DC conversion circuit, low-voltage devices that are easier to drive and have a lower product of junction capacitance and on-resistance can be used to improve efficiency, and can further increase switching frequency and power density. The corresponding voltage and current of each LLC circuit can be reduced, which can improve the heat and power distribution of the transformer, improve the efficiency and facilitate the design and optimization of the transformer. In addition, the series connection of the input parts of the two LLC circuits can effectively reduce the equivalent parasitic capacitance of the primary and secondary sides to reduce the common mode current, while improving the EMI characteristics and reducing the size of the EMI filter; it also helps reduce the volume of the output capacitor Co.

Based on the output capacitor Cp of the power factor correction circuit and the input capacitor group of the LLC circuit 120A, the DC bus capacitor structure realizes the voltage equalization of the DC bus capacitor and the current sharing function of the output current according to the following process.

Under steady-state conditions, the back-end DC-DC conversion circuit satisfies the balance between the input power at the primary side and the output power at the secondary side, there is a formula:

$$V_{in\_i} \times I_{in} = V_{out} \times I_{out\_i} \quad (1)$$

Here, $V_{in\_i}$ is the input voltage of the i-th LLC circuit, Iin is the input current of the back-end DC-DC converter circuit, Vout is the output voltage of the back-end DC-DC converter circuit, $I_{out\_i}$ is the output current of the i-th LLC circuit.

According to the input voltage of the i-th LLC circuit, the input current and output voltage of the back-end DC-DC converter circuit and the output current of the i-th LLC circuit, the gain M of the i-th LLC circuit is obtained:

$$M = V_{out}/V_{in\_i} = I_{in}/I_{out\_i} \quad (2)$$

It can be seen that when the i-th LLC circuit works in a steady state, its input voltage is equalized, and its output current is equalized.

When the output current Iout_1 flowing through the first LLC circuit of the above two LLC circuits increases, due to the balance of input power and output power, the input current Iin of the first LLC circuit will also increase; When the input current Iin flowing through the first LLC circuit increases, the input capacitor C1 connected in parallel to its input terminal will provide energy for it, and the corresponding input voltage Vin_1 of the first LLC circuit will decrease; When the input voltage Vin_1 of the first LLC circuit decreases, the input voltage Vin_2 of the second LLC circuit will increase; when the input voltage Vin_2 of the second LLC circuit increases, also due to the power balance, it will increase its own output current Iout_2; when the output current Iout_2 of the second LLC circuit increases, its input current Iin will increase, so that its input voltage Vin_2 will decrease, this state will continue to change until the input voltage and output current of each LLC circuit are equalized, so that the voltage equalization of multiple input capacitors in the input capacitor group and output current sharing can be guaranteed. The voltage equalization and current sharing capability is less sensitive to input capacitance deviation, for example, the first input capacitor and the second input capacitor may have the same rated capacity, or a deviation of ±20% can be allowed between the first input capacitor and the second input capacitor.

Figure 3A:
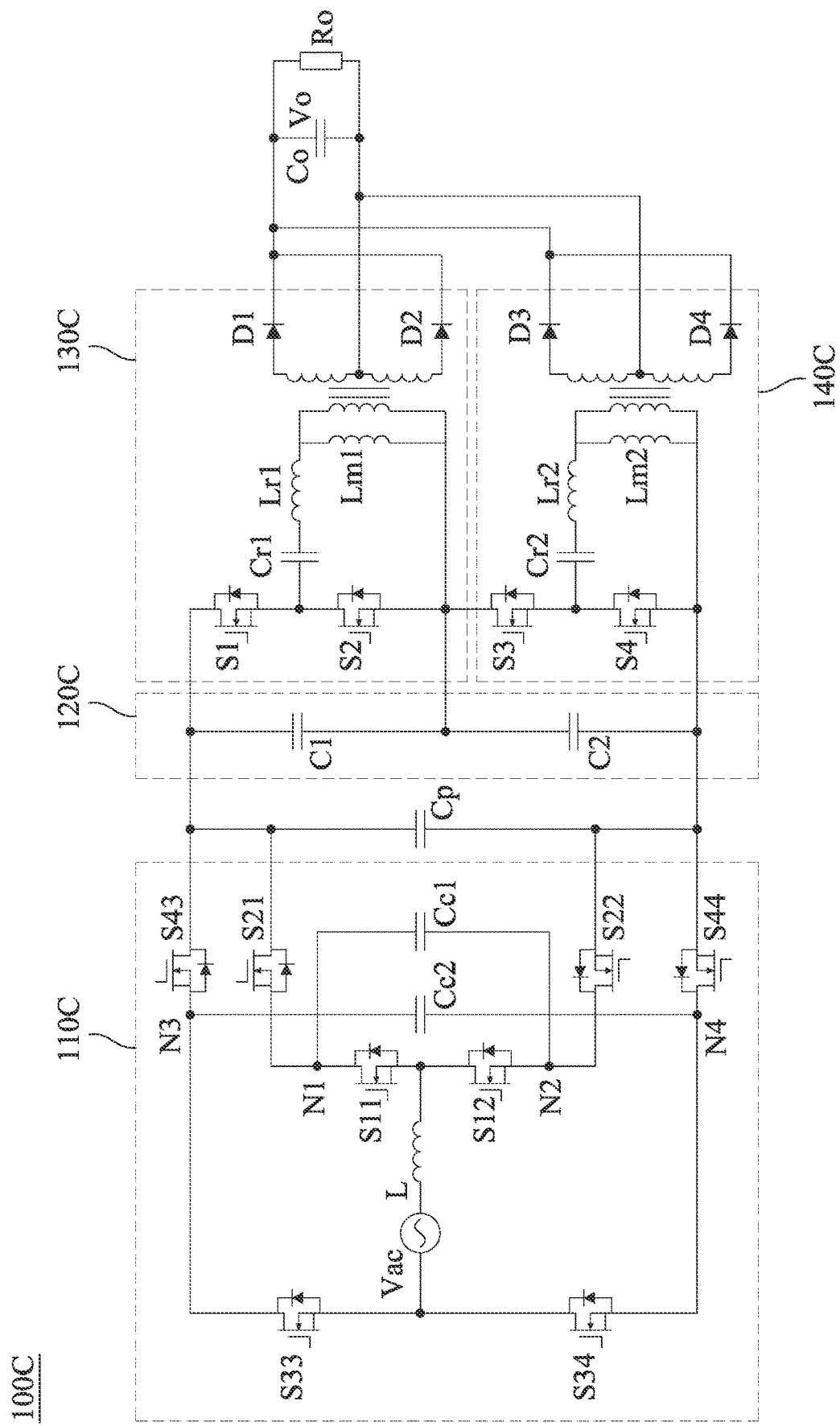
FIG. 3A shows a schematic diagram of a power conversion device according to one embodiment of the present disclosure.

FIG. 3A shows a schematic diagram of a power conversion device according to one embodiment of the present disclosure. As shown in the figure, multi-level power factor correction circuit 110C includes the inductor L, the first bridge arm and the second bridge arm. The first bridge arm and the second bridge arm are connected to both ends of the output capacitor Cp in parallel. The first bridge arm includes the fifth switch S43, the sixth switch S33, the seventh switch S34, the eighth switch S44, and the second flying capacitor Cc2. The fifth switch S43 and the sixth switch S33 are connected to the third node N3 in series, the sixth switch S33 and the seventh switch S34 are connected to each other in series, and connected at the midpoint of the first bridge arm. The seventh switch S34 and the eighth switch S44 are connected to each other in series, and connected at the fourth node N4, the second flying capacitor Cc2 is connected between the third node N3 and the fourth node N4. The second bridge arm includes the first switch S21, the second switch S11, the third switch S12, the fourth switch S22, and the first flying capacitor Cc1. The first switch S21 and the second switch S11 are connected to each other in series, and connected at the first node N1, the second switch S11 and the third switch S12 are connected to each other in series, and connected at the midpoint of the second bridge arm, the third switch S12 and the fourth switch S22 are connected to each other in series, and connected at the second node N2. The first flying capacitor Cc1 is connected between the first node N1 and the second node N2. The inductor L is coupled between the midpoint of the first bridge arm and the midpoint of the second bridge arm. In one embodiment, one terminal of the inductor L is connected to the midpoint of the second bridge arm, the other terminal of the inductor L is connected to the one terminal of the power supply Vac, and the other terminal of the power supply Vac connects the midpoint of the first bridge arm. In another embodiment, one terminal of the inductor L connects the midpoint of the first bridge arm, the other terminal of the inductor L connects the one terminal of the power supply Vac, and the other terminal of the power supply Vac connects the midpoint of the second bridge arm.

In one embodiment, the first switch to the eighth switch S21, S11, S12, S22, S43, S33, S34, S44 are the high operation frequency switches. In some embodiments, the first switch to the eighth switch S21, S11, S12, S22, S43, S33, S34, S44 are GaN or SiC MOSFET.

Figure 3B:
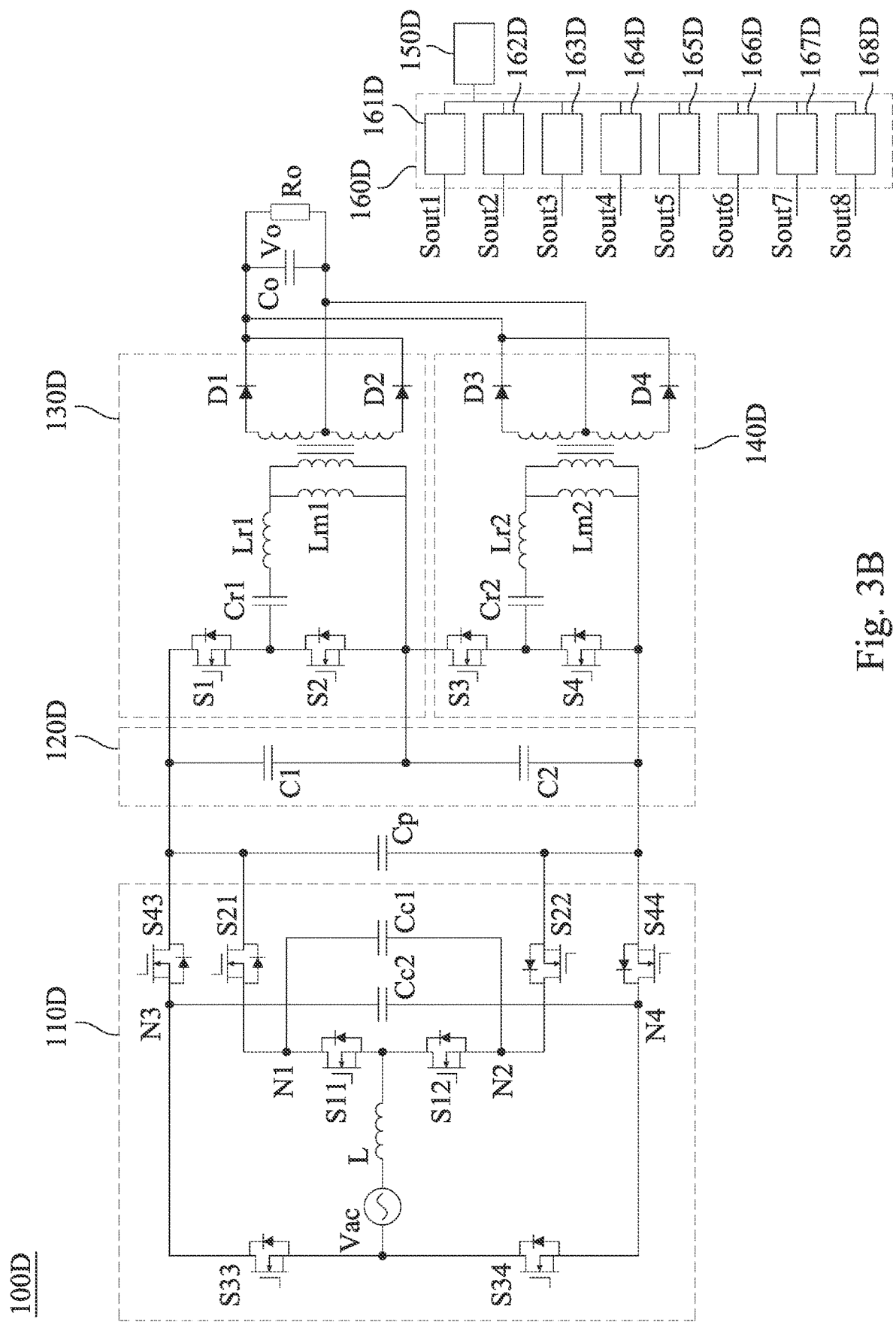
FIG. 3B shows a schematic diagram of a power conversion device according to one embodiment of the present disclosure.

FIG. 3B shows a schematic diagram of a power conversion device according to one embodiment of the present disclosure. Compared to FIG. 3A, the power conversion device 100D of FIG. 3B further includes the controller 150D and the drive module 160D. The controller 150D is coupled to the drive module 160D, the drive module 160D is respectively coupled to the first switch to the eighth switch S21, S11, S12, S22, S43, S33, S34, S44, the controller 150D generates a control signal according to a preset control method, and the drive module 160D receives the control signal and generates the multiple drive signals Sout1-Sout8 to drive the first switch to the eighth switch S21, S11, S12, S22, S43, S33, S34, S44 to be turned on or turned off. The drive signals of the first switch to the fourth switch S21, S11, S12, S22 and the drive signals of the fifth switch to the eighth switch S43, S33, S34, S44 have a phase difference by 180 degrees, the drive signals of the first switch S21 and the fourth switch S22 are complementary, the drive signals of the second switch S11 and the third switch S12 are complementary; and the drive signals of the fifth switch S43 and the eighth switch S44 are complementary, and the drive signals of the sixth switch S33 and the seventh switch S34 are complementary. The drive module 160D includes the drive circuits 161D-168D, the drive circuits 161D-168D are respectively coupled to the first switch to the eighth switch S21, S11, S12, S22, S43, S33, S34, S44, and the drive circuits 161D-168D receive the control signal and generate the corresponding drive signal Sout1-Sout8. In another embodiment, the drive module 160D can includes four drive circuits, and the first drive circuit is respectively coupled to the first switch and the fourth switch, the second drive circuit is respectively coupled to the second switch and the third switch, the third drive circuit is respectively coupled to the fifth switch and the eighth switch, and the fourth drive circuit is respectively coupled to the sixth switch and the seventh switch.

In one embodiment, the preset control method as shown in FIG. 3B includes the carrier phase shift method, or the carrier disposition control method, or space vector PWM method.

Figure 3C:
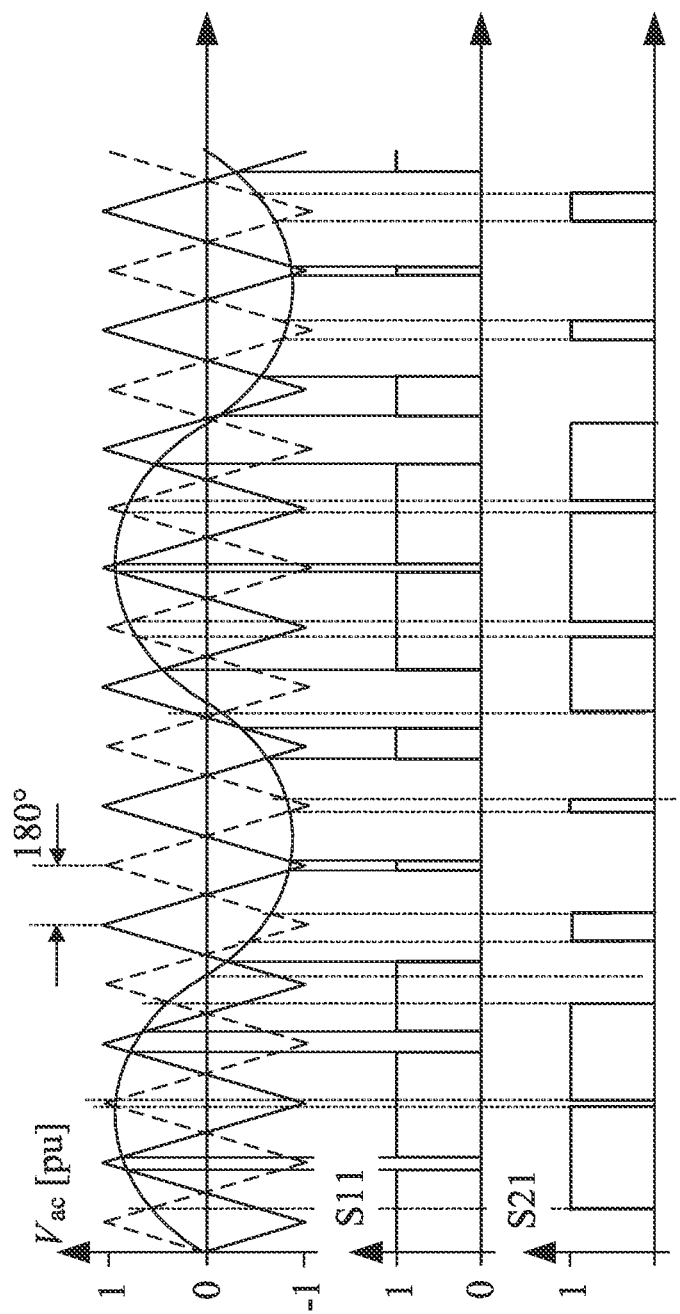
FIG. 3C shows a schematic diagram of control waveform of a power conversion device according to one embodiment of the present disclosure.

Please refer to FIG. 3A and FIG. 3B, the power conversion devices 100C, 100D is a switching power supply device, which uses a single-phase 3-level power factor correction circuit topology as the front-end power factor correction circuit and two half-bridge LLC circuits as the back-end DC-DC conversion circuit. The input parts of the two half-bridge LLC circuits are connected in series and the output parts of the two half-bridge LLC circuits are connected in parallel. Further, the first bridge arm in FIG. 3A is changed to a flying capacitor half bridge, forming a 3-level flying capacitor full bridge structure, and the corresponding modulation of the power factor correction circuit has also changed. As shown in FIG. 3C, referring to the drive signal modulation waveforms of the first switch to the fourth switch, since the phase difference between the L phase and the N phase of the power supply is 180 degrees, the modulation signal of the second bridge arm switch should be 180 degrees different from the drive signal of the switch at the same position of the first bridge arm. That is, the drive signals of the first switch S21 and the fifth switch S43 are different by 180 degrees; the drive signals of the second switch S11 and the sixth switch S33 are different by 180 degrees; the drive signals of the third switch S12 and the seventh switch S34 are different by 180 degrees; the drive signals of the fourth switch S22 and the eighth switch S44 are different by 180 degrees. The corresponding modulation of the back-end DC-DC conversion circuit remains unchanged as shown in FIG. 2D. Because the line-frequency switch is eliminated, the high-frequency ripple of the input current is improved, which not only can further reduce the volume of the input filter, but also eliminates the operation of changing the corresponding drive signal with the input polarity during the judgment and modulation of the input voltage polarity, but correspondingly increased switching loss and circuit cost.

Figure 4:
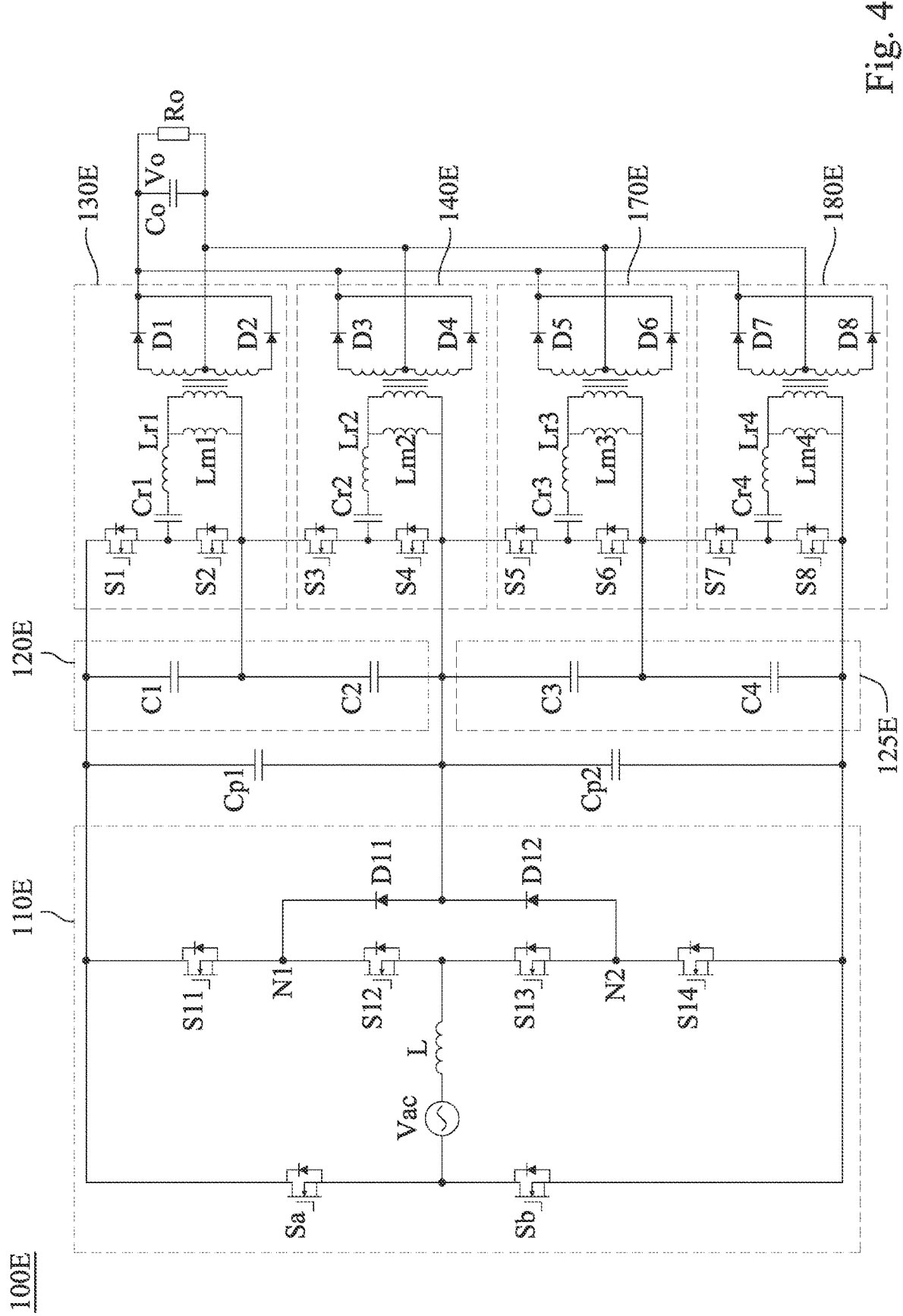
FIG. 4 shows a schematic diagram of a power conversion device according to one embodiment of the present disclosure.

FIG. 4 shows a schematic diagram of a power conversion device according to one embodiment of the present disclosure. Compared to the power conversion device 100A shown in FIG. 2A, the power conversion device 100E of FIG. 4 further includes the first output capacitor Cp1 and the second output capacitor Cp2, the first input capacitor group 120E, the second input capacitor group 125E, the third resonant conversion circuit 170E, and the fourth resonant conversion circuit 180E.

As shown in the figure, the first output capacitor Cp1 is connected to the second output capacitor Cp2 in series. The output part of the multi-level power factor correction circuit 110E includes the first output terminal and the second output terminal, and the first output terminal and the second output terminal are connected to the series branch of the first output capacitor Cp1 and the second output capacitor Cp2 in parallel. The first input capacitor group 120E is connected to the second input capacitor group 125E in series, and the series-connected first input capacitor group 120E and the second input capacitor group 125E are connected with the series-connected first output capacitor Cp1 and the second output capacitor Cp2 in parallel. The first input capacitor group 120E includes the first input capacitor C1 and the second input capacitor C2. The first input capacitor C1 are connected to the second input capacitor C2 in series, the series-connected first input capacitor C1 and the second input capacitor C2 are connected in parallel with the first output capacitor Cp1. The second input capacitor group 125E includes the third input capacitor C3 and the fourth input capacitor C4. The third input capacitor C3 are connected to the fourth input capacitor C4 in series, the series-connected third input capacitor C3 and the fourth input capacitor C4 are connected in parallel with the second output capacitor Cp2. The third resonant conversion circuit 170E are connected to the fourth resonant conversion circuit 180E in series. The input part of the third resonant conversion circuit 170E is connected to the third input capacitor C3 in parallel. The input part of the fourth resonant conversion circuit 180E is connected to the fourth input capacitor C4 in parallel.

In one embodiment, the input part of the first resonant conversion circuit 130E includes the first input terminal and the second input terminal, and the first input terminal and the second input terminal are connected to both ends of the first input capacitor C1 in parallel. The input part of the second resonant conversion circuit 140E includes the third input terminal and the fourth input terminal, and the third input terminal and the fourth input terminal are connected to both ends of the second input capacitor C2 in parallel. The input part of the third resonant conversion circuit 170E includes the fifth input terminal and the sixth input terminal, and the fifth input terminal and the sixth input terminal are connected to both ends of the third input capacitor C3 in parallel. The input part of the fourth resonant conversion circuit 180E includes the seventh input terminal and the eighth input terminal, and the seventh input terminal and the eighth input terminal is connected to both ends of the fourth input capacitor C4 in parallel. In one embodiment, the respective output part of the first resonant conversion circuit 130E, the second resonant conversion circuit 140E, the third resonant conversion circuit 170E and the fourth resonant conversion circuit 180E are connected in parallel.

In one embodiment, multi-level power factor correction circuit 110E includes the inductor L, the first bridge arm and the second bridge arm. The first bridge arm and the second bridge arm are connected between the first output terminal and the second output terminal of the multi-level power factor correction circuit 110E in parallel, the first bridge arm includes the upper bridge arm switching device Sa and the lower bridge arm switching device Sb; the upper bridge arm switching device Sa and the lower bridge arm switching device Sb are connected to each other in series, and connected at the midpoint of the first bridge arm; the second bridge arm includes the first switch S11, the second switch S12, the third switch S13, the fourth switch S14, the first clamp switch D11 and the second clamp switch D12. The first switch S11 and the second switch S12 are connected to each other in series, and connected at the first node N1, the second switch S12 and the third switch S13 are connected to each other in series, and connected at the midpoint of the second bridge arm, the third switch S13 and the fourth switch S14 are connected to each other in series, and connected at the second node N2; the first terminal of the first clamp switch D11 connects the first node N1, the second terminal of the first clamp switch D11 is connected to the first terminal of the second clamp switch D12, and the junction node of the first output capacitor Cp1 and the second output capacitor Cp2 in series. The second terminal of the second clamp switch D12 connects the second node N2; the inductor L is coupled between the midpoint of the second bridge arm and the midpoint of the first bridge arm. In one embodiment, one terminal of the inductor L connects the midpoint of the second bridge arm, the other terminal of the inductor L connects one terminal of the power supply Vac, and the other terminal of the power supply Vac connects the midpoint of the first bridge arm.

In one embodiment, the first clamp switch D11 and the second clamp switch D12 are the diodes.

In one embodiment, the first switch to the fourth switch S11, S12, S13, S14 are the high operation frequency switches. The upper bridge arm switching device Sa and the lower bridge arm switching device Sb are the low operation frequency switches, for example, the line-frequency switch.

In one embodiment, the voltage across each of the input capacitors C1~C4 is equal. In one embodiment, the output current of each of the resonant conversion circuits 130E, 140E, 170E, 180E is equal.

In one embodiment, the voltage of each of the output capacitors Cp1, Cp2 is equal. In one embodiment, the rated capacitance of the output capacitors Cp1, Cp2 is equal, that is, a deviation of ±20% can be allowed between the output capacitor Cp1, Cp2. In one embodiment, the rated capacitance of the input capacitors C1~C4 is equal, that is, a deviation of ±20% can be allowed between the rated capacitance of the input capacitors C1-C4.

Figure 5:
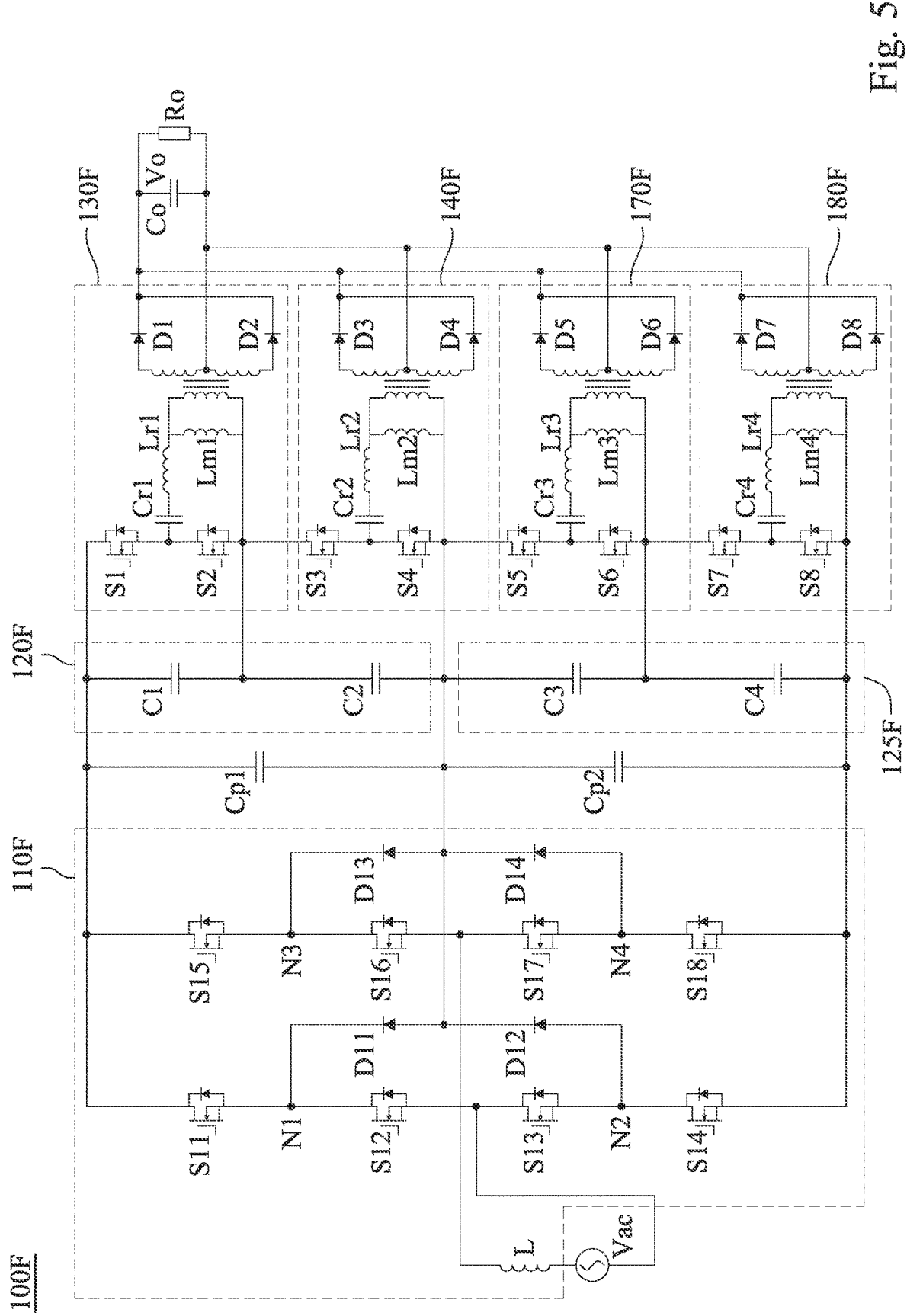
FIG. 5 shows a schematic diagram of a power conversion device according to one embodiment of the present disclosure.

FIG. 5 shows a schematic diagram of a power conversion device according to one embodiment of the present disclosure. Compared to the power conversion device 100E shown in FIG. 4, the bridge arm configuration of the power conversion device 100F of FIG. 5 is different.

As shown in FIG. 5, the multi-level power factor correction circuit 110F includes the inductor L, the first bridge arm and the second bridge arm. The first bridge arm and the second bridge arm are connected in parallel between the first output terminal and the second output terminal of the multi-level power factor correction circuit 110F, the first bridge arm includes the fifth switch S15, the sixth switch S16, the seventh switch S17, the eighth switch S18, the third clamp switch D13 and the fourth clamp switch D14. The fifth switch S15 and the sixth switch S16 are connected to each other in series, and connected at the third node N3, the sixth switch S16 and the seventh switch S17 are connected to each other in series, and connected at the midpoint of the first bridge arm, the seventh switch S17 and the eighth switch S18 are connected to each other in series, and connected at the fourth node N4, the first terminal of the third clamp switch D13 is connected at the third node N3, the second terminal of the third clamp switch D13 is connected to the first terminal of the fourth clamp switch D14, the second terminal of the fourth clamp switch D14 is connected to the fourth node N4. The second bridge arm includes the first switch S11, the second switch S12, the third switch S13, the fourth switch S14 and the first clamp switch D11 and the second clamp switch D12. The first switch S11 and the second switch S12 are connected to each other in series, and connected at the first node N1, the second switch S12 and the third switch S13 are connected to each other in series, and connected at the midpoint of the second bridge arm, the third switch S13 and the fourth switch S14 are connected to each other in series, and connected at the second node N2; the first terminal of the first clamp switch D11 is connected to the first node N1, the second terminal of the first clamp switch D11 is connected to the first terminal of the second clamp switch D12, the second terminal of the second clamp switch D12 is connected to the second node N2; the second terminal of the first clamp switch D11 is connected to the second terminal of the third clamp switch D13, the second terminal of the first clamp switch D11 is connected to the junction node of the first output capacitor Cp1 and the second output capacitor Cp2 in series; the inductor L is coupled between the midpoint of the first bridge arm and the midpoint of the second bridge arm. In one embodiment, one terminal of the inductor L connects the midpoint of the second bridge arm, the other terminal of the inductor L connects one terminal of the power supply Vac, and the other terminal of the power supply Vac connects the midpoint of the first bridge arm. In another embodiment, one terminal of the inductor L connects the midpoint of the first bridge arm, the other terminal of the inductor L connects one terminal the power supply Vac, and the other terminal the power supply Vac connects the midpoint of the second bridge arm.

In one embodiment, the first clamp switch D11, the second clamp switch D12, the third clamp switch D13 and the fourth clamp switch D14 are the diodes.

In one embodiment, the first switch to the eighth switch S11, S12, S13, S14, S15, S16, S17, and S18 are the high operation frequency switches.

Figure 6:
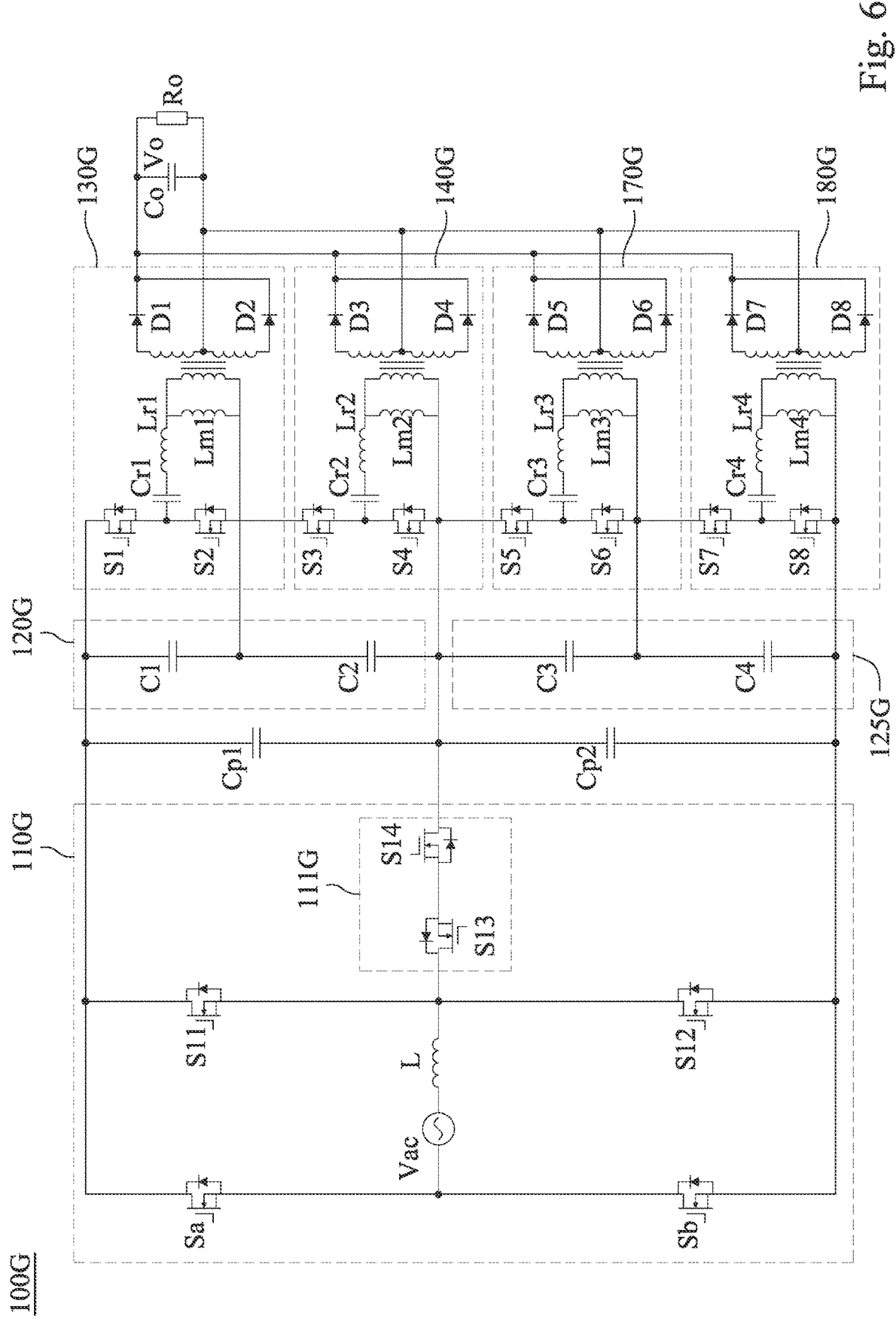
FIG. 6 shows a schematic diagram of a power conversion device according to one embodiment of the present disclosure.

FIG. 6 shows a schematic diagram of a power conversion device according to one embodiment of the present disclosure. Compared to the power conversion device 100E shown in FIG. 4, the configuration of the multi-level power factor correction circuit 110G of the power conversion device 100G of FIG. 6 is different.

As shown in the figure, multi-level power factor correction circuit 110G includes the inductor L, the first bridge arm, the second bridge arm and the bidirectional switch 111G. The first bridge arm and the second bridge arm are connected in parallel between the first output terminal and the second output terminal of the multi-level power factor correction circuit 110G. The first bridge arm includes the upper bridge arm switching device Sa and the lower bridge arm switching device Sb. The upper bridge arm switching device Sa and the lower bridge arm switching device Sb are connected to the midpoint of the first bridge arm in series. The second bridge arm includes the first switch S11 and the second switch S12. The first switch S11 and the second switch S12 are connected to each other in series, and connected at the midpoint of the second bridge arm. The bidirectional switch 111G is connected between the midpoint of the second bridge arm and the junction node of the first output capacitor Cp1 and the second output capacitor Cp2 in series, the inductor L is connected between the midpoint of the second bridge arm and the midpoint of the first bridge arm. In one embodiment, one terminal of the inductor L connects the midpoint of the second bridge arm, the other terminal of the inductor L connects one terminal of the power supply Vac, and the other terminal of the power supply Vac connects the midpoint of the first bridge arm. The bidirectional switch 111G can be two controllable switches connected in reverse and connected in series. In some embodiments, the bidirectional switch 111G includes the switch S13 and the switch S14, and the second terminal of the switch S13 connects the second terminal of the switch S14, the first terminal of the switch S13 connects the midpoint of the second bridge arm, the first terminal of the switch S14 connects the junction node of the first output capacitor Cp1 and the second output capacitor Cp2 in series.

In one embodiment, the upper bridge arm switching device Sa and the lower bridge arm switching device Sb are the low operation frequency switches, for example, the line-frequency switch; the first switch S11 and the second switch S12 are the high operation frequency switches.

Figure 7:
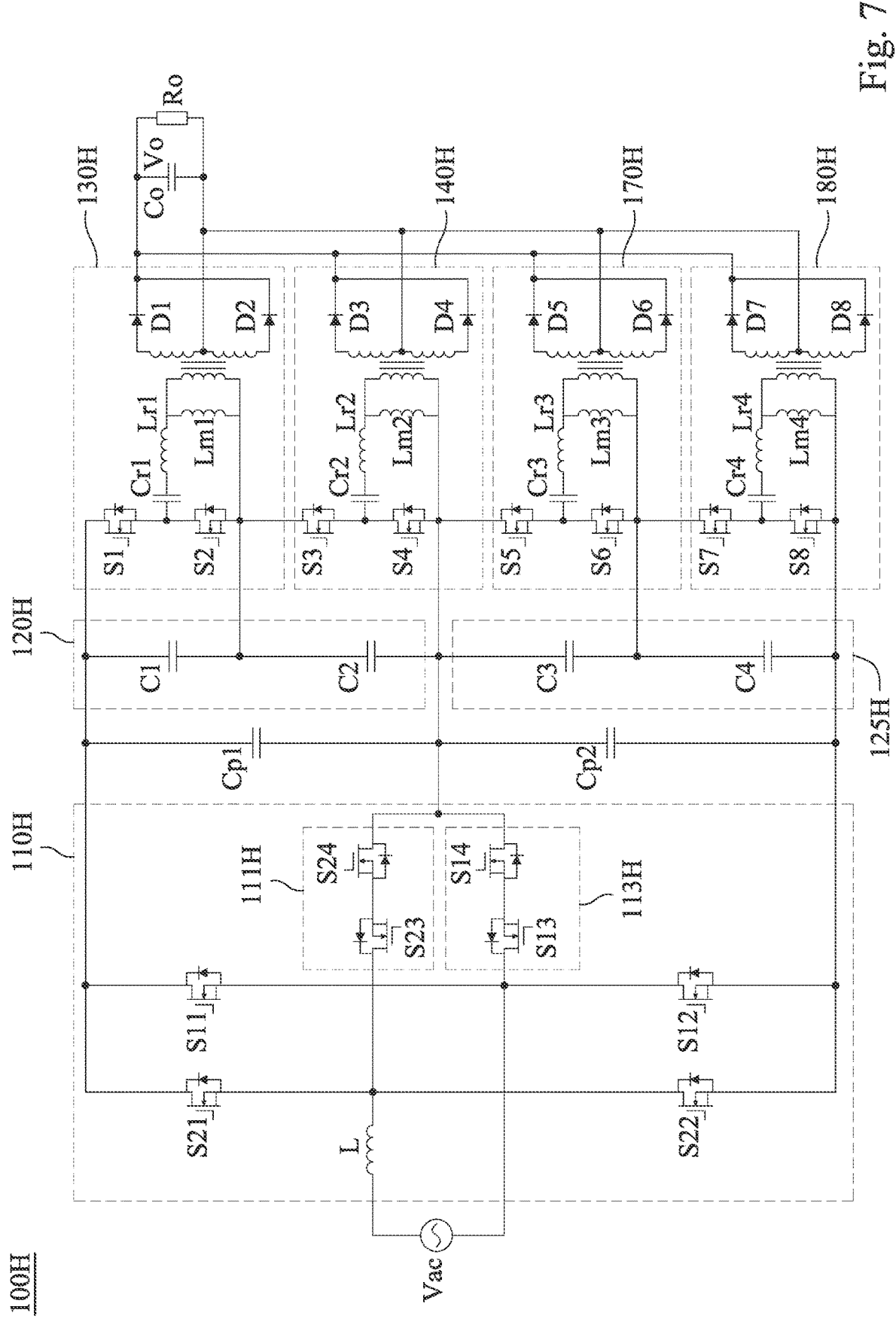
FIG. 7 shows a schematic diagram of a power conversion device according to one embodiment of the present disclosure.

FIG. 7 shows a schematic diagram of a power conversion device according to one embodiment of the present disclosure. Compared with the power conversion device 100G shown in FIG. 6, the bridge arm configuration of the multi-level power factor correction circuit 110H of the power conversion device 100H in FIG. 7 is different.

As shown in FIG. 7, multi-level power factor correction circuit 110H includes the inductor L, the first bridge arm, the second bridge arm, the first bidirectional switch 111H and the second bidirectional switch 113H. The first bridge arm and the second bridge arm are connected in parallel between the first output terminal and the second output terminal of the multi-level power factor correction circuit 110H. The first bridge arm includes the third switch S21 and the fourth switch S22. The third switch S21 and the fourth switch S22 are connected to the midpoint of the first bridge arm in series. The second bridge arm includes the first switch S11 and the second switch S12. The first switch S11 and the second switch S12 are connected to the midpoint of the second bridge arm in series. The first bidirectional switch 111H is located between the midpoint of the first bridge arm and the junction node of the first output capacitor Cp1 and the second output capacitor Cp2 in series, the second bidirectional switch 113H is located connected between the midpoint of the second bridge arm and the junction node of the first output capacitor Cp1 and the second output capacitor Cp2 in series. The inductor L is coupled between the midpoint of the first bridge arm and the midpoint of the second bridge arm. In some embodiments, the first bidirectional switch 111H includes two switches connected in reverse series. The first bidirectional switch 111H includes the switch S23 and the switch S24, the first terminal of the switch S23 connects the midpoint of the first bridge arm, the second terminal of the switch S23 connects the second terminal of the switch S24, the first terminal of the switch S24 connects the junction node of the first output capacitor Cp1 and the second output capacitor Cp2 in series. The second bidirectional switch 113H includes two switches connected in reverse series. The second bidirectional switch 113H includes the switch S13 and the switch S14. The first terminal of the switch S13 connects the midpoint of the second bridge arm, the second terminal of the switch S13 connects the second terminal of the switch S14, the first terminal of the switch S14 connects the junction node of the first output capacitor Cp1 and the second output capacitor Cp2 in series.

In one embodiment, one terminal of the inductor L connects the midpoint of the second bridge arm, the other terminal of the inductor L connects one terminal of the power supply Vac, and the other terminal of the power supply Vac connects the midpoint of the first bridge arm. In another embodiment, one terminal of the inductor L connects the midpoint of the first bridge arm, the other terminal of the inductor L connects one terminal of the power supply Vac, and the other terminal of the power supply Vac connects the midpoint of the second bridge arm.

In one embodiment, the first switch to the fourth switch S11, S12, S21, and S22 are the high operation frequency switches.

Figure 8:
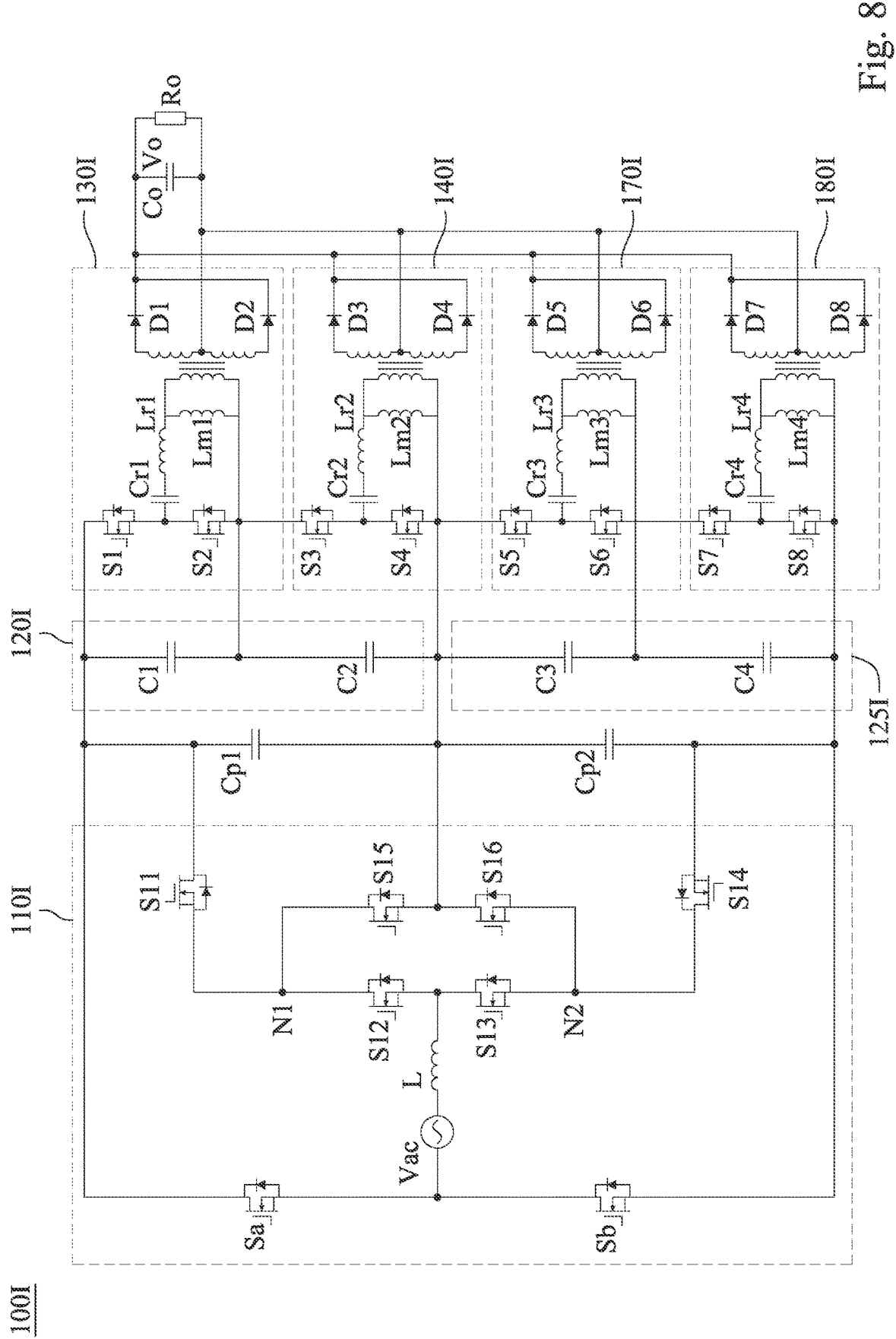
FIG. 8 shows a schematic diagram of a power conversion device according to one embodiment of the present disclosure.

FIG. 8 shows a schematic diagram of a power conversion device according to one embodiment of the present disclosure. Compared with the power conversion device 100E shown in FIG. 4, the configuration of the multi-level power factor correction circuit 110I of the power conversion device 100I in FIG. 8 is different.

As shown in the figure, multi-level power factor correction circuit 110I includes the inductor L, the first bridge arm and the second bridge arm. The first bridge arm and the second bridge arm are connected in parallel between the first output terminal and the second output terminal of the multi-level power factor correction circuit 110I. The first bridge arm includes the upper bridge arm switching device Sa and the lower bridge arm switching device Sb. The upper bridge arm switching device Sa and the lower bridge arm switching device Sb are connected to each other in series, and connected at the midpoint of the first bridge arm. The second bridge arm includes the first switch S11, the second switch S12, the third switch S13, the fourth switch S14, the first clamp switch S15, and the second clamp switch S16. The first switch S11 and the second switch S12 are connected to each other in series, and connected at the first node N1, the second switch S12 and the third switch S13 are connected to each other in series, and connected at the midpoint of the second bridge arm, the third switch S13 and the fourth switch S14 are connected to each other in series, and connected at the second node N2. The first terminal of the first clamp switch S15 connects the first node N1. The second terminal of the first clamp switch S15 is connected to the first terminal of the second clamp switch S16 and the junction node of the first output capacitor Cp1 and the second output capacitor Cp2 in series. The second terminal of the second clamp switch S16 connects the second node N2. The inductor L is coupled between the midpoint of the second bridge arm and the midpoint of the first bridge arm. In one embodiment, one terminal of the inductor L connects the midpoint of the second bridge arm, the other terminal of the inductor L connects one terminal of the power supply Vac, and the other terminal of the power supply Vac connects the midpoint of the first bridge arm.

In one embodiment, the first clamp switch S15 and the second clamp switch S16 are the controllable switches.

In one embodiment, the first switch to the fourth switch S11, S12, S13, S14 are the high operation frequency switches. The upper bridge arm switching device Sa and the lower bridge arm switching device Sb are the low operation frequency switches.

Figure 9:
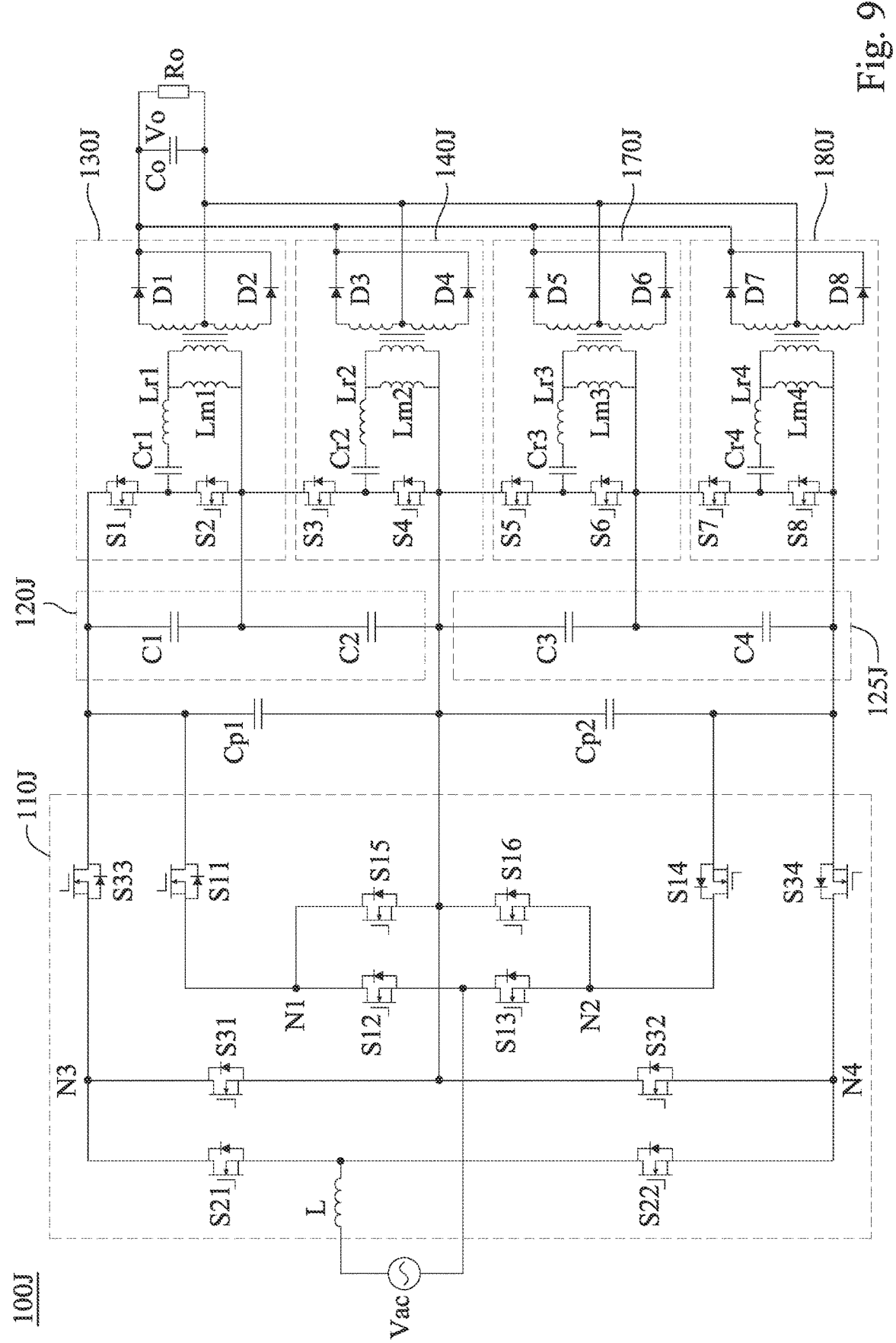
FIG. 9 shows a schematic diagram of a power conversion device according to one embodiment of the present disclosure.

FIG. 9 shows a schematic diagram of a power conversion device according to one embodiment of the present disclosure. Compared with the power conversion device 100E shown in FIG. 8, the multi-level power factor correction circuit 110J of the power conversion device 100J in FIG. 9 has a different bridge arm configuration.

As shown in FIG. 9, the multi-level power factor correction circuit 110J includes the inductor L, the first bridge arm and the second bridge arm. The first bridge arm and the second bridge arm are connected in parallel between the first output terminal and the second output terminal of the multi-level power factor correction circuit 110J. The first bridge arm includes the fifth switch S33, the sixth switch S21, the seventh switch S22, the eighth switch S34, the third clamp switch S31 and the fourth clamp switch S32. The fifth switch S33 and the sixth switch S21 are connected to the third node N3 in series, the sixth switch S21 and the seventh switch S22 are connected to each other in series, and connected at the midpoint of the first bridge arm, the seventh switch S22 and the eighth switch S34 are connected to each other in series, and connected at the fourth node N4. The second bridge arm includes the first switch S11, the second switch S12, the third switch S13, the fourth switch S14, the fifth switch S15, the sixth switch S16, the first clamp switch S15 and the second clamp switch S16. The first switch S11 and the second switch S12 are connected to each other in series, and connected at the first node N1, the second switch S12 and the third switch S13 are connected to each other in series, and connected at the midpoint of the second bridge arm, the third switch S13 and the fourth switch S14 are connected to each other in series, and connected at the second node N2. The first terminal of the first clamp switch S15 connects the first node N1, the second terminal of the first clamp switch S15 is connected to the first terminal of the second clamp switch S16 and the junction node of the first output capacitor Cp1 and the second output capacitor Cp2 in series, the second terminal of the second clamp switch S16 connects the second node N2; the first terminal of the third clamp switch S31 connects the third node N3, the second terminal of the third clamp switch S31 is connected to the first terminal of the fourth clamp switch S32 and the junction node of the first output capacitor Cp1 and the second output capacitor Cp2 in series, the second terminal of the fourth clamp switch S32 connects the fourth node N4. The inductor L is coupled between the midpoint of the first bridge arm and the midpoint of the second bridge arm. In one embodiment, one terminal of the inductor L connects the midpoint of the second bridge arm, the other terminal of the inductor L connects one terminal of the power supply Vac, and the other terminal of the power supply Vac connects the midpoint of the first bridge arm. In another embodiment, one terminal of the inductor L connects the midpoint of the first bridge arm, the other terminal of the inductor L connects one terminal of the power supply Vac, and the other terminal of the power supply Vac connects the midpoint the second bridge arm.

In one embodiment, since the phase difference between the L phase and the N phase of the power supply is 180 degrees, the drive signal of the second bridge arm switch should be 180 degrees different from the drive signal of the switch at the same position of the first bridge arm. That is, the drive signals of the first switch S11 and the fifth switch S33 have a phase difference by 180 degrees; the drive signals of the second switch S12 and the sixth switch S21 have a phase difference by 180 degrees; the drive signals of the third switch S13 and the seventh switch S22 have a phase difference by 180 degrees; the drive signals of the fourth switch S14 and the eighth switch S34 have a phase difference by 180 degrees.

In one embodiment, the first clamp switch S15, the second clamp switch S16, the third clamp switch S31 and the fourth clamp switch S32 are the controllable switches.

In one embodiment, the first switch to the eighth switch S11, S12, S13, S14, S33, S21, S22, and S34 are the high operation frequency switches.

FIG. 4-FIG. 9 show the switching power supply structure with two output capacitors, four LLC circuits and two input capacitor groups. When used in the diode clamped topology (neutral point clamped, NPC) as shown in FIG. 4 and FIG. 5 or the T type neutral point clamped topology (TNPC) as shown in FIG. 6 and FIG. 7, or the active neutral point clamped topology (ANPC) shown in FIG. 8 and FIG. 9 is implemented, due to the characteristic of the DC bus capacitor structure, the voltage balance between the two output capacitors Cp1 and Cp2 does not need to be controlled by the front-end power factor correction circuit, the voltage equalization function can be realized only by the normal operation of the back-end DC-DC conversion circuit, which can simplify the neutral point potential balance control algorithm when the front-end uses NPC, TNPC or ANPC topologies, which is beneficial to the increase of the level number of the multi-level circuit. The modulation method of the back-end DC-DC conversion circuit may refer to the modulation method of the back-end DC-DC conversion circuit of the power conversion device of FIG. 2A. In one embodiment, the back-end DC-DC conversion circuit includes four LLC circuits, and the four LLC circuits are connected in series at their input sides and connected in parallel at their output sides. The drive signals of the 4 LLC circuits have a phase difference by 90 degrees. In one embodiment, the back-end DC-DC conversion circuit includes m LLC circuits, and the drive signals of the m LLC circuits have a phase difference by 360°/m, and m is a positive integer.

Figure 10:
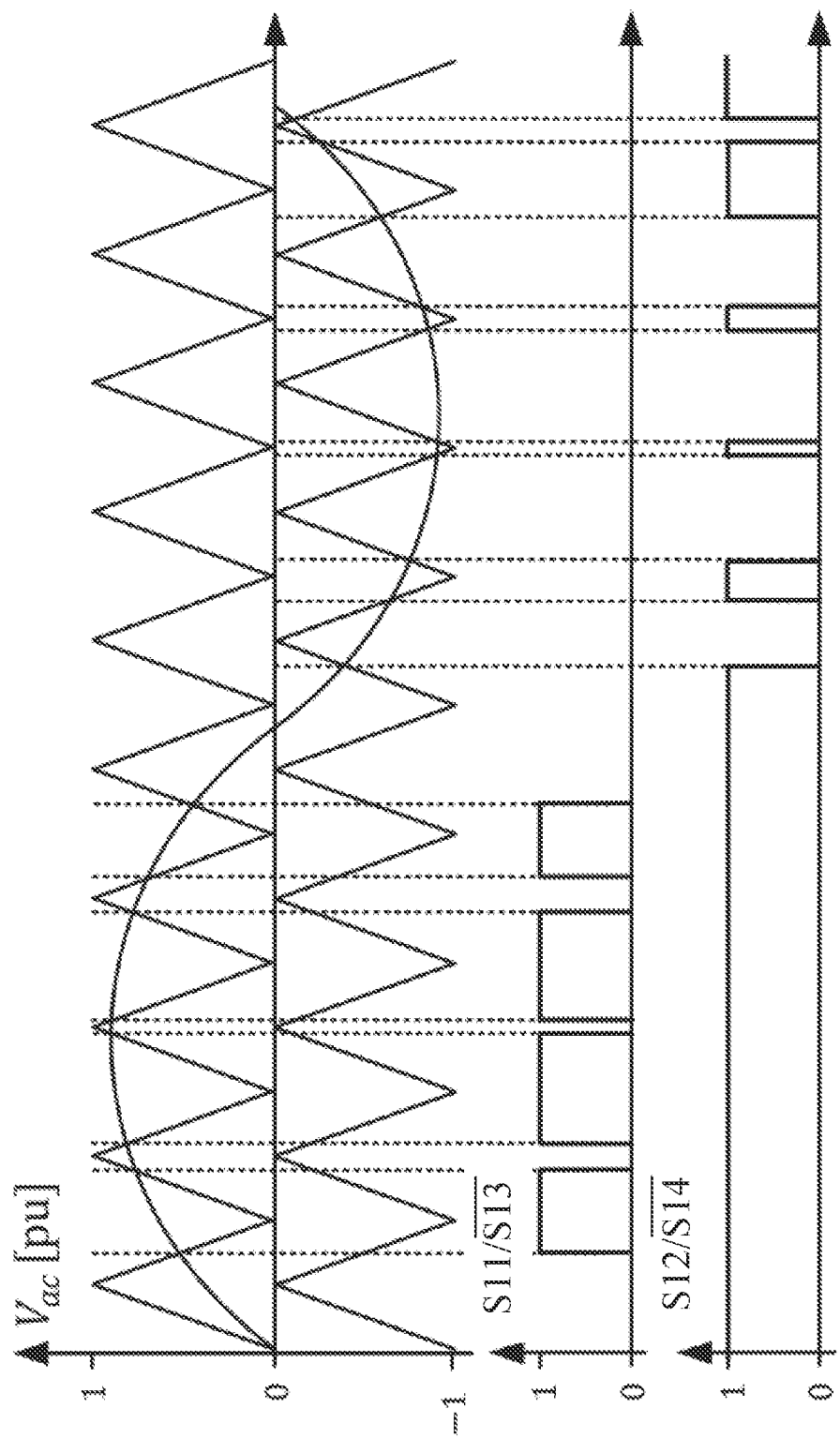
FIG. 10 shows a schematic diagram of control waveform of a power conversion device according to one embodiment of the present disclosure.
Figure 11:
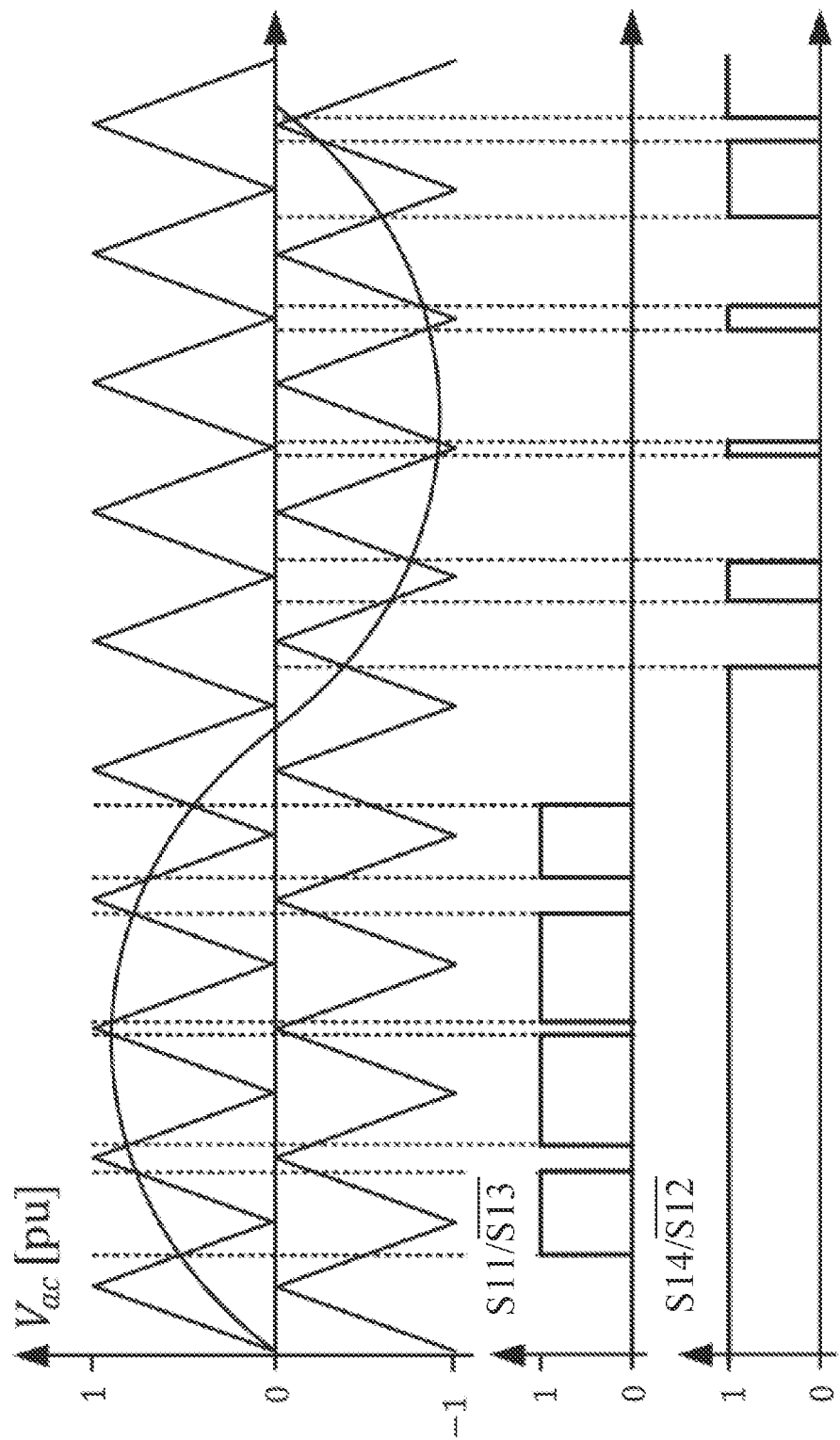
FIG. 11 shows a schematic diagram of control waveform of a power conversion device according to one embodiment of the present disclosure.
Figure 12:
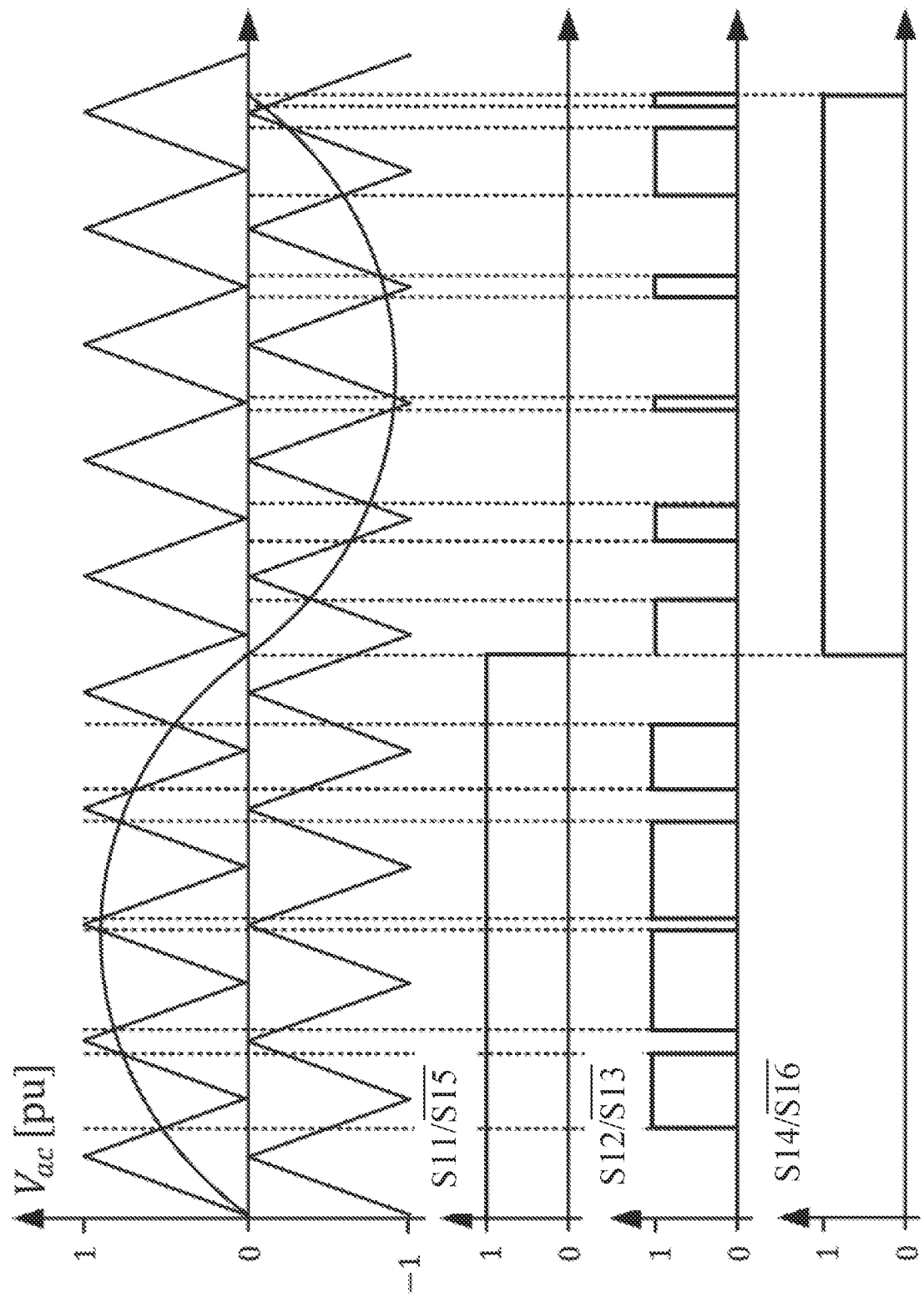
FIG. 12 shows a schematic diagram of control waveform of a power conversion device according to one embodiment of the present disclosure.

The corresponding modulation method is shown in FIG. 10-FIG. 12. The modulation method is called carrier disposition modulation method, which is a modulation method of N-level topology realized by comparing N−1 carriers with modulating waves, N is a natural number greater than 2, and there are many ways to realize according to the various carrier direction. Here is a schematic diagram of the carrier disposition modulation method in the same direction.

As shown in FIG. 10, the drive signals of the first switch S11 and the third switch S13 are complementary, the drive signals of the second switch S12 and the fourth switch S14 are complementary. For the NPC topology (topology shown in FIG. 4 and FIG. 5), when the modulating wave is larger than the upper carrier, the first switch S11 and the second switch S12 are turned on; when the modulation wave is smaller than the lower carrier, the third switch S13 and the fourth switch S14 are turned on, in other cases, the second switch S12 and the third switch S13 are turned on.

As shown in FIG. 11, the drive signals of the third switch device S11 and the switch S13 of the bidirectional switch are complementary, the drive signals of the fourth switch device S12 and the switch S14 of the bidirectional switch are complementary. For the TNPC topology (topology shown in FIG. 6 and FIG. 7), when the modulating wave is larger than the upper carrier, the first switch S11 and the switch S14 are turned on; when the modulation wave is smaller than the lower carrier, the second switch S12 and the switch S13 are turned on, in other cases, the switches S13 and S14 are turned on.

As shown in FIG. 12, the drive signals of the first switch S11 and the first clamp switch S15 are complementary, the drive signals of the second switch S12 and the third switch S13 are complementary, and the drive signals of the fourth switch S14 and the second clamp switch S16 are complementary. For the ANPC topology (topologies shown in FIG. 8 and FIG. 9), when the modulating wave is larger than the upper carrier, the first switch S11, the second switch S12, and the second clamp switch S16 are turned on; when the modulation wave is smaller than the lower carrier, the third switch S13, the fourth switch S14, and the first clamp switch S15 are turned on; when the modulating wave is smaller than the upper carrier, the first switch S11, the third switch S13, and the second clamp switch S16 are turned on; when the modulation wave is larger than the lower carrier, the second switch S12, the fourth switch S14, and the first clamp switch S15 are turned on.

The above-mentioned switching devices and switches may be the controllable switches, for example, semiconductor switching devices such as the Insulated Gate Bipolar Transistor (IGBT), the Metal-Oxide-Semiconductor Field-Effect Transistor (MOSFET) or the Gallium Nitride Transistor (GaN), etc.

The power conversion device of the present disclosure is a high-efficiency and high-power-density switching power supply topology structure that can use low-voltage devices to reduce switching losses, reduce common mode noise, reduce input current ripple and output current ripple, reduce the size of input inductor and the volume of electromagnetic interference filters, and improve EMI characteristics.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power conversion device, comprising:
 a multi-level power factor correction circuit;
 at least one output capacitor, electrically connected to an output part of the multi-level power factor correction circuit in parallel;
 at least one input capacitor group, electrically connected to the at least one output capacitor in parallel, comprising:
  a first input capacitor; and
  a second input capacitor, electrically connected to the first input capacitor in series;
 a first resonant conversion circuit, wherein an input part of the first resonant conversion circuit is electrically connected to the first input capacitor in parallel; and
 a second resonant conversion circuit, wherein an input part of the second resonant conversion circuit is electrically connected to the second input capacitor in parallel.

2. The power conversion device of claim 1, wherein the at least one output capacitor comprises a line-frequency capacitor, and the at least one input capacitor group comprises a high-frequency capacitor.

3. The power conversion device of claim 1, wherein the multi-level power factor correction circuit comprises a first output terminal and a second output terminal; the at least one output capacitor comprises a first output capacitor; the at least one input capacitor group comprises the first input capacitor and the second input capacitor;
 wherein both ends of the first output capacitor respectively connect to the first output terminal and the second output terminal; the first input capacitor and the second input capacitor, which are connected to each other in series, are connected to the first output capacitor in parallel;
 wherein the first resonant conversion circuit comprises a first input terminal and a second input terminal, wherein the first input terminal and the second input terminal are respectively connected to both ends of the first input capacitor;
 wherein the second resonant conversion circuit comprises a third input terminal and a fourth input terminal, wherein the third input terminal and the fourth input terminal are respectively connected to both ends of the second input capacitor;
 wherein an output part of the first resonant conversion circuit is connected to an output part the second resonant conversion circuit in parallel.

4. The power conversion device of claim 3, wherein the multi-level power factor correction circuit comprises an inductor, a first bridge arm and a second bridge arm; each of the first bridge arm and the second bridge arm is connected to both ends of the first output capacitor in parallel; the first bridge arm comprises a first switching device and a second switching device; the first switching device and the second switching device are connected to each other in series, and connected at a midpoint of the first bridge arm; the second bridge arm comprises a first switch, a second switch, a third switch, a fourth switch, and a first flying capacitor;

wherein the first switch and the second switch are connected to each other in series, and connected at a first node; the second switch and the third switch are connected to each other in series, and connected at the midpoint of the second bridge arm; and the third switch and the fourth switch are connected to each other in series, and connected at a second node; the first flying capacitor is connected between the first node and the second node; the inductor is coupled between the midpoint of the second bridge arm and the midpoint of the first bridge arm.

5. The power conversion device of claim 4, wherein the first switching device and a second switching device are low operation frequency switches; the first switch, the second switch, the third switch and the fourth switch are high operation frequency switches.

6. The power conversion device of claim 5, wherein the high operation frequency switches are GaN MOSFET or SiC MOSFET.

7. The power conversion device of claim 4, further comprising a controller and a drive module, wherein the controller is coupled to the drive module, the drive module is respectively coupled to the first switch to the fourth switch, the controller generates a control signal according to a preset control method, and the drive module receives the control signal and generates a plurality of drive signals to drive the first switch to the fourth switch to be turned on or turned off, wherein the first switch and the second switch are complementarily turned on, and the third switch and the fourth switch are complementarily turned on.

8. The power conversion device of claim 3, wherein the multi-level power factor correction circuit comprises an inductor, a first bridge arm, and a second bridge arm; each of the first bridge arm and the second bridge arm is connected to both ends of the first output capacitor in parallel; the first bridge arm comprises a fifth switch, a sixth switch, a seventh switch, an eighth switch, and a second flying capacitor; the second bridge arm comprises a first switch, a second switch, a third switch, a fourth switch, and a first flying capacitor;

wherein the fifth switch and the sixth switch are connected to each other in series, and connected at a third node, the sixth switch and the seventh switch are connected to each other in series, and connected at a midpoint of the first bridge arm, the seventh switch and the eighth switch are connected to each other in series, and connected at a fourth node, the second flying capacitor is connected between the third node and the fourth node;

wherein the first switch and the second switch are connected to each other in series, and connected at a first node, the second switch and the third switch are connected to each other in series, and connected at the midpoint of the second bridge arm, and the third switch and the fourth switch are connected to each other in series, and connected at a second node; the first flying capacitor is connected between the first node and the second node; the inductor is coupled between the midpoint of the first bridge arm and the midpoint of the second bridge arm.

9. The power conversion device of claim 8, wherein the first switch to the eighth switch are high operation frequency switches.

10. The power conversion device of claim 8, further comprising a controller and a drive module, wherein the controller is coupled to the drive module, the drive module is respectively coupled to the first switch to the eighth switch, the controller generates a control signal according to a preset control method, the drive module receives the control signal and generates multiple drive signals to drive the first switch to eighth switch to be turned on or turned off, wherein the drive signal of the first switch to the fourth switch and the drive signal of the fifth switch to the eighth switch have a phase difference by 180 degrees.

11. The power conversion device of claim 3, wherein the multi-level power factor correction circuit uses a carrier phase shift method, a carrier disposition method, or space vector PWM method to control the switches of the circuit.

12. The power conversion device of claim 1, wherein a phase shift control is adopted between the first resonant conversion circuit and the second resonant conversion circuit.

13. The power conversion device of claim 1, wherein a drive signal of the first resonant conversion circuit and the drive signal of the second resonant conversion circuit have a phase difference by 90 degrees.

14. The power conversion device of claim 1, wherein the at least one output capacitor comprises:
    a first output capacitor; and
    a second output capacitor, connected to the first output capacitor in series;
    wherein the output part of the multi-level power factor correction circuit comprises a first output terminal and a second output terminal, wherein the first output capacitor and the second output capacitor connected in series are connected to the first output terminal and the second output terminal in parallel;
    wherein the at least one input capacitor group comprises:
    a first input capacitor group comprising the first input capacitor and the second input capacitor; the first input capacitor and the second input capacitor connected in series are connected to the first output capacitor in parallel; and
    a second input capacitor group, comprising:
        a third input capacitor; and
        a fourth input capacitor connected to the third input capacitor in series; the third input capacitor and the fourth input capacitor connected in series are connected to the second output capacitor in parallel;
    the power conversion device further comprising:
    a third resonant conversion circuit, wherein an input part of the third resonant conversion circuit is connected to the third input capacitor in parallel; and
    a fourth resonant conversion circuit, wherein an input part of the fourth resonant conversion circuit is connected to the fourth input capacitor in parallel.

15. The power conversion device of claim 14, wherein the input part of the third resonant conversion circuit comprises a fifth input terminal and a sixth input terminal, wherein the fifth input terminal and the sixth input terminal are respectively connected to both ends of the third input capacitor;
    wherein the input part of the fourth resonant conversion circuit comprises a seventh input terminal and an eighth input terminal, wherein the seventh input terminal and the eighth input terminal are respectively connected to both ends of the fourth input capacitor;

wherein the output part the first resonant conversion circuit, the output part of the second resonant conversion circuit, the output part of the third resonant conversion circuit, and the output part of the fourth resonant circuit are connected in parallel.

16. The power conversion device of claim 14, wherein the multi-level power factor correction circuit comprises a inductor, a first bridge arm, and a second bridge arm; the first bridge arm and the second bridge arm are parallel to the first output terminal and the second output terminal of the multi-level power factor correction circuit, the first bridge arm comprises a first switching device and a second switching device; the first switching device and the second switching device are connected to a midpoint of the first bridge arm in series; the second bridge arm comprises a first switch, a second switch, a third switch, a fourth switch, a first clamp switch, and a second clamp switch;

wherein the first switch and the second switch are connected to each other in series, and connected at a first node, the second switch and the third switch are connected to each other in series, and connected at the midpoint of the second bridge arm, and the third switch and the fourth switch are connected to each other in series, and connected at a second node; a first end of the first clamp switch is connected to the first node, a second end of the first clamp switch is connected to a first end of the second clamp switch and a junction node of the first output capacitor and the second output capacitor in series, the second end of the second clamp switch is connected to the second node; the inductor is coupled between the midpoint of the second bridge arm and the midpoint of the first bridge arm.

17. The power conversion device of claim 16, wherein the first clamp switch and the second clamp switch are diodes or controllable switches.

18. The power conversion device of claim 14, wherein the multi-level power factor correction circuit comprises a inductor, a first bridge arm and a second bridge arm; the first bridge arm and the second bridge arm are parallel to the first output terminal and the second output terminal of the multi-level power factor correction circuit, the first bridge arm comprises a fifth switch, a sixth switch, a seventh switch, an eighth switch, a third clamp switch and a fourth clamp switch; the second bridge arm comprises a first switch, second switch, a third switch, a fourth switch, a first clamp switch, and a second clamp switch;

wherein the fifth switch and the sixth switch are connected to a third node in series, the sixth switch and the seventh switch are connected to each other in series, and connected at a midpoint of the first bridge arm, the seventh switch and the eighth switch are connected to each other in series, and connected at a fourth node, a first end of the third clamp switch is connected to the third node, a second end of the third clamp switch is connected to the first end of the fourth clamp switch, the second end of the fourth clamp switch is connected to the fourth node;

wherein the first switch and the second switch are connected to each other in series, and connected at a first node, the second switch and the third switch are connected to each other in series, and connected at a midpoint of the second bridge arm, the third switch and the fourth switch are connected to each other in series, and connected at a second node; a first end of the first clamp switch is connected to the first node, a second end of the first clamp switch is connected to a first end of the second clamp switch, a second end of the third clamp switch and a junction node of the first output capacitor and the second output capacitor in series, a second end of the second clamp switch is connected to the second node; the inductor is coupled between the midpoint of the first bridge arm and the midpoint of the second bridge arm.

19. The power conversion device of claim 18, wherein the first clamp switch, the second clamp switch, the third clamp switch and the fourth clamp switch are diodes or controllable switches.

20. The power conversion device of claim 14, wherein the multi-level power factor correction circuit comprises a inductor, a first bridge arm, a second bridge arm and a bidirectional switch; the first bridge arm and the second bridge arm are parallel to the first output terminal and the second output terminal of the multi-level power factor correction circuit, the first bridge arm comprises a first switching device and a second switching device, the first switching device and the second switching device are connected to each other in series, and connected at a midpoint of the first bridge arm; the second bridge arm comprises a first switch and a second switch, the first switch and the second switch are connected to each other in series, and connected at the midpoint of the second bridge arm, the bidirectional switch is connected between the midpoint of the second bridge arm and a junction node of a first output capacitor and the second output capacitor in series, the inductor is coupled between the midpoint of the second bridge arm and a midpoint of the first bridge arm.

21. The power conversion device of claim 14, wherein the multi-level power factor correction circuit comprises a inductor, a first bridge arm, a second bridge arm, a first bidirectional switch and a second bidirectional switch; the first bridge arm and the second bridge arm are parallel to the first output terminal and the second output terminal of the multi-level power factor correction circuit, the first bridge arm comprises a third switch and a fourth switch, the third switch and the fourth switch are connected to a midpoint of the first bridge arm in series; the second bridge arm comprises a first switch and a second switch, the first switch and the second switch are connected to each other in series, and connected at the midpoint of the second bridge arm, the first bidirectional switch is connected between the midpoint the first bridge arm and a junction node of the first output capacitor and the second output capacitor in series, the second bidirectional switch is connected between the midpoint of the second bridge arm and the junction node of the first output capacitor and the second output capacitor in series, the inductor is coupled between the midpoint of the first bridge arm and the midpoint of the second bridge arm.

22. A power conversion device, comprising:
a multi-level power factor correction circuit;
at least one output capacitor connected to an output part of the multi-level power factor correction circuit;
at least one input capacitor group, which is connected to the at least one output capacitor in parallel; wherein the at least one input capacitor group comprises a plurality of input capacitors, and the plurality of input capacitors is connected to each other in series; and
at least one resonant conversion module, wherein the at least one resonant conversion module comprises multiple resonant conversion circuits, and the multiple resonant conversion circuits correspond to the plurality of input capacitors one to one, an input part of each of the multiple resonant conversion circuits is connected to a corresponding one of the plurality of input capacitors.

23. The power conversion device of claim 22, wherein a phase shift control is adopted between the multiple resonant conversion circuits.

24. The power conversion device of claim 22, wherein when a number of multiple resonant conversion circuits is 2, the drive signals between the multiple resonant conversion circuits differ by 90 degrees; when the number of multiple resonant conversion circuits is greater than or equal to 3, the drive signals of the multiple resonant conversion circuits differ by 360°/m, wherein m is a total number of the multiple resonant conversion circuits, and m is a positive integer.

25. The power conversion device of claim 22, wherein the at least one output capacitor comprises a plurality of output capacitors connected in series; the at least one input capacitor group comprises a plurality of input capacitors group connected in series, the plurality of input capacitors group correspond to the output capacitor of the plurality of output capacitors one to one, each of the plurality of input capacitors group is connected to the corresponding one of the plurality of the output capacitors in parallel.

26. The power conversion device of claim 25, wherein each of the plurality of output capacitors is applied to the same voltage.

27. The power conversion device of claim 26, wherein each of the plurality of output capacitors has the same rated capacitance value.

28. The power conversion device of claim 22, wherein each of the plurality of input capacitors is applied to the same voltage.

29. The power conversion device of claim 22, wherein each of the multiple resonant conversion circuits has the same output current.

30. The power conversion device of claim 22, wherein each of the plurality of input capacitors has the same rated capacitance value.

31. The power conversion device of claim 22, wherein the at least one output capacitor comprises one output capacitor; the at least one input capacitor group comprises one input capacitor group, and the input capacitor group is connected to the output capacitor in parallel.

* * * * *